(12) United States Patent
Katoh

(10) Patent No.: US 9,592,717 B2
(45) Date of Patent: Mar. 14, 2017

(54) HEAT EXCHANGE SYSTEM

(71) Applicant: DENSO CORPORATION, Kariya, Aichi-pref. (JP)

(72) Inventor: Yoshiki Katoh, Chita-gun (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 246 days.

(21) Appl. No.: 14/362,345

(22) PCT Filed: Dec. 3, 2012

(86) PCT No.: PCT/JP2012/007739
§ 371 (c)(1),
(2) Date: Jun. 2, 2014

(87) PCT Pub. No.: WO2013/084466
PCT Pub. Date: Jun. 13, 2013

(65) Prior Publication Data
US 2014/0290296 A1    Oct. 2, 2014

(30) Foreign Application Priority Data

Dec. 5, 2011 (JP) ................ 2011-266137
Nov. 13, 2012 (JP) ................ 2012-249578

(51) Int. Cl.
*B60H 1/00* (2006.01)
*B60L 1/00* (2006.01)
(Continued)

(52) U.S. Cl.
CPC ..... *B60H 1/00042* (2013.01); *B60H 1/00328* (2013.01); *B60H 1/03* (2013.01);
(Continued)

(58) Field of Classification Search
CPC .... B60H 1/00042; B60H 1/3213; B60H 1/03; B60H 1/3227; B60H 1/00328;
(Continued)

(56) References Cited

U.S. PATENT DOCUMENTS 6,347,528 B1 * 2/2002 Iritani ................ B60H 1/00357
62/323.1
2004/0060316 A1    4/2004 Ito et al.
(Continued)

FOREIGN PATENT DOCUMENTS

CN    101652544    2/2010
FR    2876323 A1 * 4/2006 ......... B60H 1/00885
(Continued)

OTHER PUBLICATIONS

U.S. Appl. No. 14/009,262, filed Oct. 1, 2013, Katoh et al.
(Continued)

*Primary Examiner* — Emmanuel Duke
(74) *Attorney, Agent, or Firm* — Harness, Dickey & Pierce, P.L.C.

(57) ABSTRACT

A heat exchange system includes a first heat exchanger that radiates heat of at least a cooling cycle, a cooler circuit in which a coolant for a heat-emitting device flows, a plurality of heat exchangers that are connected to the cooler circuit and radiate heat of the coolant, and a blower that sends air to the first heat exchanger and the plurality of heat exchangers to cool. The plurality of heat exchangers are arranged in a blowing direction of the blower, and separately radiate heat of the cooler circuit. The heat exchanger, which is disposed on the windward side, of the plurality of heat exchangers is thermally connected to the first heat exchanger, and the heat exchanger disposed on the windward side radiates heat by itself and also radiates heat through the first heat exchanger.

17 Claims, 12 Drawing Sheets

(51) Int. Cl.
*F28F 9/02* (2006.01)
*F28D 1/04* (2006.01)
*F28D 1/053* (2006.01)
*B60H 1/32* (2006.01)
*B60H 1/03* (2006.01)
*F28D 1/02* (2006.01)
*B60K 11/04* (2006.01)

(52) U.S. Cl.
CPC ......... *B60H 1/3213* (2013.01); *B60H 1/3227* (2013.01); *B60L 1/003* (2013.01); *F28D 1/0246* (2013.01); *F28D 1/0452* (2013.01); *F28D 1/05391* (2013.01); *F28F 9/0278* (2013.01); *B60K 11/04* (2013.01); *B60L 2240/36* (2013.01); *B60L 2240/425* (2013.01); *B60L 2250/16* (2013.01); *F28F 2009/0287* (2013.01); *F28F 2215/02* (2013.01); *Y02T 10/642* (2013.01)

(58) Field of Classification Search
CPC ... F25D 1/0246; F28F 9/0278; F28F 2215/02; F28F 2009/0287; F28D 1/0452
See application file for complete search history.

(56) References Cited

U.S. PATENT DOCUMENTS

| | | | | |
|---|---|---|---|---|
| 2004/0134217 | A1* | 7/2004 | Itoh | B60H 1/00392 62/324.1 |
| 2006/0248906 | A1* | 11/2006 | Burk | B60H 1/00914 62/160 |
| 2007/0181356 | A1* | 8/2007 | Ando | F01P 7/048 180/65.27 |
| 2008/0041071 | A1 | 2/2008 | Itoh | |
| 2009/0205353 | A1* | 8/2009 | Takahashi | B60H 1/00899 62/324.1 |
| 2011/0048671 | A1* | 3/2011 | Nishikawa | B60H 1/00885 165/42 |
| 2013/0061631 | A1* | 3/2013 | Katoh | F28D 1/0426 62/515 |
| 2013/0283835 | A1 | 10/2013 | Katoh et al. | |

FOREIGN PATENT DOCUMENTS

| | | | |
|---|---|---|---|
| JP | 3275415 | B2 | 4/2002 |
| JP | 2005289095 | A * | 10/2005 |
| JP | 2005289095 | A | 10/2005 |
| JP | 2006002588 | A | 1/2006 |
| JP | 2006160165 | A | 6/2006 |
| JP | 2007278624 | A | 10/2007 |
| JP | 4023320 | B2 | 12/2007 |
| JP | 2008056152 | A | 3/2008 |
| JP | 4311115 | B2 | 8/2009 |
| JP | 4583900 | | 9/2010 |
| JP | 2012007821 | A * | 1/2012 |
| JP | 2012007821 | A | 1/2012 |
| JP | 2012144245 | A | 8/2012 |

OTHER PUBLICATIONS

International Search Report and Written Opinion (in Japanese with English Translation) for PCT/JP2012/007739, mailed Feb. 19, 2013; ISA/JP.

Office Action dated Sep. 25, 2015 in corresponding Chinese Application No. 201280059907.4.

Office Action dated Jan. 6, 2016 in corresponding Japanese Application No. 2012-249578.

* cited by examiner

HEAT EXCHANGE SYSTEM

CROSS REFERENCE TO RELATED APPLICATION APPLICATIONS

This application is a U.S. National Phase Application under 35 U.S.C. 371 of International Application No. PCT/JP2012/007739 filed on Dec. 3, 2012 and published in Japanese as WO/2013/084466 A1 on Jun. 13, 2013. This application is based on Japanese Patent Applications No. 2011-266137 filed on Dec. 5, 2011, and No. 2012-249578 filed on Nov. 13, 2012. The disclosures of all of the above applications are incorporated herein by reference.

TECHNICAL FIELD

The present disclosure relates to a heat exchange system that includes at least a dual heat radiation or heat absorption system, and more particularly, to a heat exchange system that includes a heat exchanger for a vehicle air conditioner and a radiation heat exchanger for a device other than an engine of a vehicle.

BACKGROUND ART

PTL 1 discloses a device to obtain a function of facilitating a warm-up operation of an engine in addition to a function as a heater heating air to be blown into a passenger compartment using a coolant, which is heated by an engine, as a heat source and a function as a heater using a high-pressure refrigerant as a heat source.

To accomplish the above specified purpose, the function as a heater heating air to be blown into a passenger compartment using a coolant as a heat source and the function as a heater using a high-pressure refrigerant as a heat source are realized by one heat exchanger (a heater for an air conditioner), and a U-shaped tube, which exchanges heat between the high-pressure refrigerant and the coolant, is disposed in a refrigerant tank. Further, when the temperature of the coolant is low, the coolant is allowed to circulate through the U-shaped tube. When the temperature of the coolant is high, the coolant is allowed to circulate through a coolant tube.

PTL 2 discloses a vehicle air-conditioning apparatus including a heat pump-type refrigerating cycle that improves the heating efficiency when performing a heating operation by using a heating unit, which uses hot water as a heat source, in combination. To accomplish the above specified purpose, a heat exchanger for cooling is disposed on the leeward side of a blower in a duct that guides blown air into a passenger compartment of a vehicle. A heat exchanger for heating and a heater core, which forms a hot water-type heating unit, are disposed on the leeward side of the heat exchanger for cooling. The heater core is supplied with brine, which is heated by a combustion-type hot water heater, by a pump, and heats circumambient air by radiating the heat of the brine into the duct. The heater core is disposed on the leeward side of the heat exchanger for heating, and shares fins with the heat exchanger for heating.

A three-fluid heat exchanger to be described in this disclosure will be described here. A heat exchanger is to generally exchange heat between two media, such as air and refrigerant. However, the three-fluid heat exchanger to be described in this disclosure is a heat exchanger that substantially exchanges heat simultaneously between three media, such as coolant, air, and refrigerant.

Further, the media are not limited to coolant, refrigerant, and air, and are called a first fluid, a second fluid, and a third fluid. Accordingly, the heater core, which shares the fins with the heat exchanger for heating of PTL 2, forms the three-fluid heat exchanger. That is, the three-fluid heat exchanger is well-known.

Further, PTL 3 discloses a vehicle air conditioner with a reduced size that has a rapid heating operation mode using a high-pressure refrigerant. To accomplish the above specified purpose, a function as a heater heating air to be blown into a passenger compartment using an engine coolant as a heat source and a function as a heater using a high-pressure refrigerant as a heat source are realized by one heat exchanger (a heater for an air conditioner).

In PTL 3, when rapid heating is performed, the engine coolant is allowed to circulate between a bypass passage and a heater for an air conditioner and the high-pressure refrigerant is allowed to circulate through the heater for the air conditioner while the inflow of the engine coolant, which has flowed out of the engine, into the heater for an air conditioner is stopped. Accordingly, while the mountability of the air conditioner on the vehicle is improved through the reduction of the size of the air conditioner, rapid heating capacity is improved. The heater for the air conditioner is also the three-fluid heat exchanger to be described in this disclosure, and involves three fluids, such as engine coolant, refrigerant, and air.

A demand for the management of the heat of a vehicle increases when there is increase in the kinds of thermal devices other than an engine in a vehicle. However, particularly, a coolant circuit for a vehicle has a large difference in the increase and decrease of the amount of heat caused by various situations. Accordingly, when a heat exchanger, which is designed and manufactured so as to have required maximum performance, is disposed in a vehicle as each heat exchanger, a very large space is needed and there can be waste of space. Meanwhile, if the waste heat of an automobile is reduced, the amount of heat to be radiated at a normal operation has tendency to be continuously low. However, specific solutions to these issues are not described in PTLs 1 to 3.

CITATION LIST

Patent Literature

PTL 1: Japanese Patent No. 4023320
PTL 2: Japanese Patent No. 3275415
PTL 3: Japanese Patent No. 4311115

SUMMARY OF INVENTION

An object of this disclosure is to provide a space-saving heat exchange system that can cope with increase in capacity of a second fluid circuit including a low-temperature heat exchanger radiating the heat of a device other than an engine in a vehicle while substantially maintaining performance as a first fluid circuit related to a cooling cycle.

The description of PTLs mentioned as the related art can be introduced or incorporated by reference as the description of technical elements described in this description.

According to an aspect of this disclosure, a heat exchange system includes a first heat exchanger that radiates heat of at least a cooling cycle, a cooler circuit in which a coolant for a heat-emitting device flows, a plurality of heat exchangers that are connected to the cooler circuit and radiate heat of the coolant; and a blower that cools the first heat exchanger and the plurality of heat exchangers by blowing air. The radiation of the heat of the cooler circuit is separately performed by the plurality of heat exchangers that are arranged in a blowing direction of the blower. One of the plurality of heat exchangers which is disposed on the windward side is thermally connected to the first heat exchanger, and radiates heat by itself and also radiates heat through the first heat exchanger.

According to this, the one of the plurality of heat exchangers, which is disposed on the windward side, radiates heat by itself and also radiates heat through the first heat exchanger. Accordingly, even when a request for the heat radiation capacity of the cooler circuit for the heat-emitting device considerably exceeds a request for the heat radiation capacity at a normal time, the request for the heat radiation capacity, which considerably exceeds the request at the normal time, can be satisfied using a heat radiation function of the first heat exchanger according to the cooling cycle. Therefore, the size of the heat exchanger required for the radiation of heat of the cooler circuit, can be reduced.

The heat exchanger, which is disposed on the windward side, radiates heat by itself and also radiates heat through the first heat exchanger. For example, during a cooling operation, the radiation of the heat of the first heat exchanger serving as a radiator and the radiation of the heat of the heat exchanger disposed on the windward side are performed together.

In this case, as the amount of heat radiated from the heat exchanger, which is disposed on the windward side, is smaller, the heat radiation performance of the first heat exchanger is improved. Incidentally, a heat-generating scene of a device (for example, an inverter or a motor generator) is very limited, and the amount of heat generated in the heat-generating scene is quite large although not as much as the engine.

Considering these circumstances, when the amount of radiated heat is small, it is preferable that the heat radiation performance of the heat exchanger, which is disposed on the leeward side in the direction of airflow, be exhibited to the maximum by radiating heat at the heat exchanger disposed on the leeward side. Further, in case where the amount of generated heat is very large, it is preferable that the heat radiation operation be integrally performed by the first heat exchanger and the heat exchanger disposed on the windward side. The reason for this is as follows: when the first heat exchanger also takes charge of the radiation of heat, it is possible to cope with the amount of heat to be radiated without the increase in the physical size of the heat exchanger disposed on the leeward side in the direction of airflow. Accordingly, space efficiency can be improved.

A space-saving heat exchange system can be provided in this way. The reason for the first heat exchanger and the heat exchanger disposed on the windward side being disposed on the windward side is to prevent the heat exchangers from being affected by heat that is radiated from the heat exchanger disposed on the leeward side in the direction of airflow.

For example, the first heat exchanger is configured of an air-conditioning heat exchanger that forms a part of a first fluid circuit performing air-conditioning in a passenger compartment of a vehicle, and the cooler circuit is configured of a second fluid circuit that cools the heat-emitting device other than an engine of the vehicle.

According to this, a scene in which the amount of heat radiated from the second fluid circuit for a device other than an engine becomes maximum is limited. Accordingly, since the air-conditioning heat exchanger is used to radiate heat in the scene in which the amount of heat to be radiated becomes maximum, the heat to be radiated of the cooler circuit, which forms the second fluid circuit for the heat-emitting device, can be radiated by a small heat exchanger.

For example, the plurality of heat exchangers are configured of a second heat exchanger that is disposed on a windward side and a third heat exchanger that is disposed on a leeward side, and the second heat exchanger is disposed adjacent to or integrally with the first heat exchanger.

According to this, since the first heat exchanger is disposed on the windward side, the first heat exchanger and the second heat exchanger preferentially radiate heat first. Accordingly, heat can be radiated from the third heat exchanger that radiates the heat of the cooler circuit to the air of which temperature has risen due to the heat radiated from the first and second heat exchangers. Further, since the second heat exchanger is disposed adjacent to or integrally with the first heat exchanger, the heat of the second heat exchanger can also be radiated from the first heat exchanger.

For example, the first heat exchanger is configured of a heat exchanger for brine that radiates heat of the brine flowing in a liquid-cool condenser after a refrigerant compressed by a compressor is cooled by the liquid-cool condenser.

According to this, even when a request for heat radiation capacity of the cooler circuit for the device considerably exceeds a request for heat radiation capacity at a normal time, the request for heat radiation capacity, which considerably exceeds the request at the normal time, can be satisfied using a heat radiation function of the radiator of the cooling cycle, not only in a cooling cycle using an air-cool condenser but also in a cooling cycle using the liquid-cool condenser.

For example, the first heat exchanger, and the heat exchanger which is disposed on the windward side, of the plurality of heat exchangers are configured of a three-fluid heat exchanger that transfers heat mutually using a part of a core.

According to this, since the first heat exchanger, and the heat exchanger which is disposed on the windward side, of the plurality of heat exchangers are integrally configured of a three-fluid heat exchanger, the heat exchange system can be made compact by the integration.

For example, the second heat exchanger and the third heat exchanger are arranged in a manner that the coolant which serves as internal fluid flows through the heat exchangers in parallel.

According to this, since the flows of the coolants serving as internal fluids are in parallel, a pressure loss of the entire cooler circuit, which is configured of the second fluid circuit cooling the heat-emitting device other than an engine of the vehicle, is small, and the flow rate of the coolant present in the heat exchangers can be increased.

For example, the second heat exchanger and the third heat exchanger are arranged in a manner that the coolant which serves as internal fluid flows through the heat exchangers in series.

According to this, since the coolant serving as internal fluid flows in series, the flowing direction of air and an arrangement direction in which the second and third heat exchangers are arranged in series can be set to the same direction, and a heat exchanger to have a great heat-radiation effect, of the second and third heat exchangers can be disposed on the windward side.

In other words, in the structure in which the second heat exchanger is disposed adjacent to or integrally with the first heat exchanger, the second heat exchanger and the third heat exchanger are arranged in series so that an internal fluid flows from the third heat exchanger to the second heat exchanger.

Accordingly, after heat is roughly radiated by the third heat exchanger, the coolant can be introduced into the second heat exchanger that is disposed adjacent to or integrally with the first heat exchanger. Therefore, the charge of the amount of heat radiated from the first and second heat exchangers is reduced, the performance of the first heat exchanger (for example, performance as a condenser) is improved, and power consumed during the operation of the cooling cycle is reduced, so that a power-saving effect can be obtained.

Further, since the flow of the coolant becomes a counter flow against the flow of air, total heat exchanger efficiency of the second and third heat exchangers also becomes very good. As a result, the size of the third heat exchanger is reduced.

For example, the third heat exchanger is disposed on an upstream side and the second heat exchanger is disposed on a downstream side in a flow direction of the internal fluid.

According to this, the temperature of the internal fluid is lowered by heat radiation in the third heat exchanger, and then the internal fluis flows into the second heat exchanger, such that the temperature of the second heat exchanger is lowered. Therefore, in accordance with the lowering in the temperature, the amount of heat transferred to the first heat exchanger, which exchanges heat with the second heat exchanger, can be reduced, so the original heat exchange performance of the first heat exchanger can be improved.

For example, the heat exchange system further includes a flow control valve that adjusts a flow rate of the coolant in the second heat exchanger. When it is regarded that a temperature of the coolant is higher than or equal to or a predetermined temperature, the flow control valve is opened. Heat is radiated not only from the third heat exchanger but also from the second heat exchanger.

According to this, when it is regarded that a temperature of the coolant reaches the predetermined temperature or becomes higher than the predetermined temperature, the flow control valve is opened. Heat is radiated not only from the third heat exchanger but also from the second heat exchanger. Accordingly, since heat is also radiated from the second heat exchanger only when needed, the heat radiation performance of the cooler circuit can be improved. Accordingly, the first heat exchanger, which receives heat from the second heat exchanger, can be efficiently used. In other words, when needed, that is, when the temperature of the coolant is equal to or higher than the predetermined temperature, heat can be sufficiently radiated, in the scene in which the amount of heat to be radiated becomes maximum, by allowing the coolant to flow in both the second and first heat exchangers that are disposed adjacent to each other or integrally with each other.

For example, a refrigerating cycle is configured of a heat pump cycle that is capable of cooling and heating air in the passenger compartment of the vehicle, and includes a cooling/heating switching unit that switches a heating cycle and the cooling cycle. When a cycle is switched to the heating cycle, the first heat exchanger of the cooling cycle operates as a heat absorber.

According to this, the sizes of the heat exchangers, which are required for the radiation of heat of the cooler circuit, can be reduced even in a heat exchange system that performs heating and cooling by the heat pump cycle. Further, heat generated from the heat-emitting device is absorbed by the first heat exchanger, which is the evaporator of the heat pump cycle, so that an effect of improving heating performance and an effect of suppressing the formation of frost (including defrosting) can be obtained.

For example, a refrigerating cycle is configured of a heat pump cycle that is capable of cooling and heating air in the passenger compartment of the vehicle, and includes a cooling/heating switching unit that switches a heating cycle and the cooling cycle. When a cycle is switched to the heating cycle, the first heat exchanger of the cooling cycle operates as a heat absorber. When the heating cycle operates, the flow control valve is controlled so that the coolant flows in the second heat exchanger.

According to this, a heating operation can be performed while waste heat, which is to be radiated from the second heat exchanger, is absorbed by the heat absorber that is configured of the first heat exchanger.

For example, a refrigerating cycle is configured of a heat pump cycle that is capable of cooling and heating air in the passenger compartment of the vehicle, and includes a cooling/heating switching unit that switches a heating cycle and the cooling cycle. When a cycle is switched to the heating cycle, the first heat exchanger of the cooling cycle operates as a heat absorber. The cooler circuit is provided with a heat-storage bypass passage bypassing at least the second heat exchanger and a passage switching unit that switches the inflow of the coolant to the heat-storage bypass passage or the second heat exchanger. The coolant, which has passed through the heat-storage bypass passage, is allowed to flow into the second heat exchanger by the passage switching unit during defrosting of the heat absorber.

According to this, since the coolant is allowed to flow into the second heat exchanger when defrosting is performed, frost adhering to the heat absorber, which is disposed adjacent to or integrally with the second heat exchanger, can be quickly removed. That is, the heat generated from the heat-emitting device is stored, and the heat absorber, which is disposed adjacent to or integrally with the second heat exchanger, is subjected to defrosting as necessary, so that the recovery of heating performance can be performed.

For example, when defrosting is not performed, the passage switching unit allows the coolant to store heat by flowing the coolant in the heat-storage bypass passage. When defrosting is performed, the passage switching unit stops the inflow of the coolant into the heat-storage bypass passage and allows the coolant, which has stored heat, to flow into the second heat exchanger.

According to this, when defrosting is performed, the defrosting of the heat absorber, which is disposed adjacent to or integrally with the second heat exchanger, can be quickly performed by the coolant that has stored heat in the heat-storage bypass passage.

For example, the heat-emitting device of the cooler circuit is configured of a device other than an engine. The third heat exchanger is integrated with a heat exchanger for the engine of a cooler circuit for the engine.

According to this, the third heat exchanger is integrated with the heat exchanger for the engine (engine radiator), so that reduction in size can be achieved. Further, since the fluids, which flow in the third heat exchanger and the heat exchanger for the engine, are different from the condensed refrigerant of the first heat exchanger that radiates the heat of the cooling cycle (operating as a condenser) and are the same kind of low-pressure fluid, the integration between the third heat exchanger and the heat exchanger for the engine is very easy and a space can also be saved by the integration.

For example, the third heat exchanger and the heat exchanger for the engine are integrally formed as a three-fluid heat exchanger that transfers heat to each other using a part of a common core and exchanges heat with air.

According to this, the third heat exchanger and the heat exchanger for the engine are integrated as the three-fluid heat exchanger, so that reduction in size can be achieved. Meanwhile, the timing of the heat-generating scene of the heat exchanger for the engine is different from that of the heat-emitting device other than the engine. For this reason, when one of the heat exchanger for the engine and the heat-emitting device radiates heat, the amount of heat radiated from the other of the heat exchanger for the engine and the heat-emitting device is small. As a result, an effect of substantially increasing the heat-transfer area of one, which needs to radiate heat, of the third heat exchanger and the heat exchanger for the engine is exhibited by the action of three-fluid heat exchanger that transfers heat to each other using a part of a common core at least.

For example, the first heat exchanger and the second heat exchanger are integrally formed on a windward side as a first three-fluid heat exchanger that transfers heat to each other using a part of a core, and the third heat exchanger and the heat exchanger for the engine are integrally formed on a leeward side as a second three-fluid heat exchanger that transfers heat to each other using a part of a core.

According to this, two of the three-fluid heat exchanger are disposed on the windward side and the leeward side relative to each other, so that the entire volume can be further reduced.

For example, the first three-fluid heat exchanger and the second three-fluid heat exchanger are further integrated with each other, so that the first heat exchanger, the second heat exchanger, the third heat exchanger, and the heat exchanger for the engine transfer heat to each other using a part of a common core.

According to this, the first heat exchanger, the second heat exchanger, the third heat exchanger, and the heat exchanger for the engine mutually transfer heat using a part of a common core. Accordingly, since the first heat exchanger, the second heat exchanger, the third heat exchanger, and the heat exchanger for the engine complementarily transfer and receive heat, the physical size of the entire heat exchanger is reduced. As a result, the heat exchanger can be easily mounted on the vehicle.

For example, in the second heat exchanger disposed on the windward side and the third heat exchanger disposed on the leeward side, the coolant which serves as internal fluid flows through the heat exchangers in series from the third heat exchanger to the second heat exchanger, and the flow of the coolant becomes a counter flow against a flow of air that is directed to the leeward side from the windward side.

According to this, since the flow of the coolant becomes the counter flow against the flow of air, temperature difference is reduced between each heat exchanger and air. Accordingly, total heat exchange efficiency of the heat exchangers with respect to the air becomes high. As a result, the size of the heat exchanger can be reduced.

DESCRIPTION OF EMBODIMENTS

Figure 1:
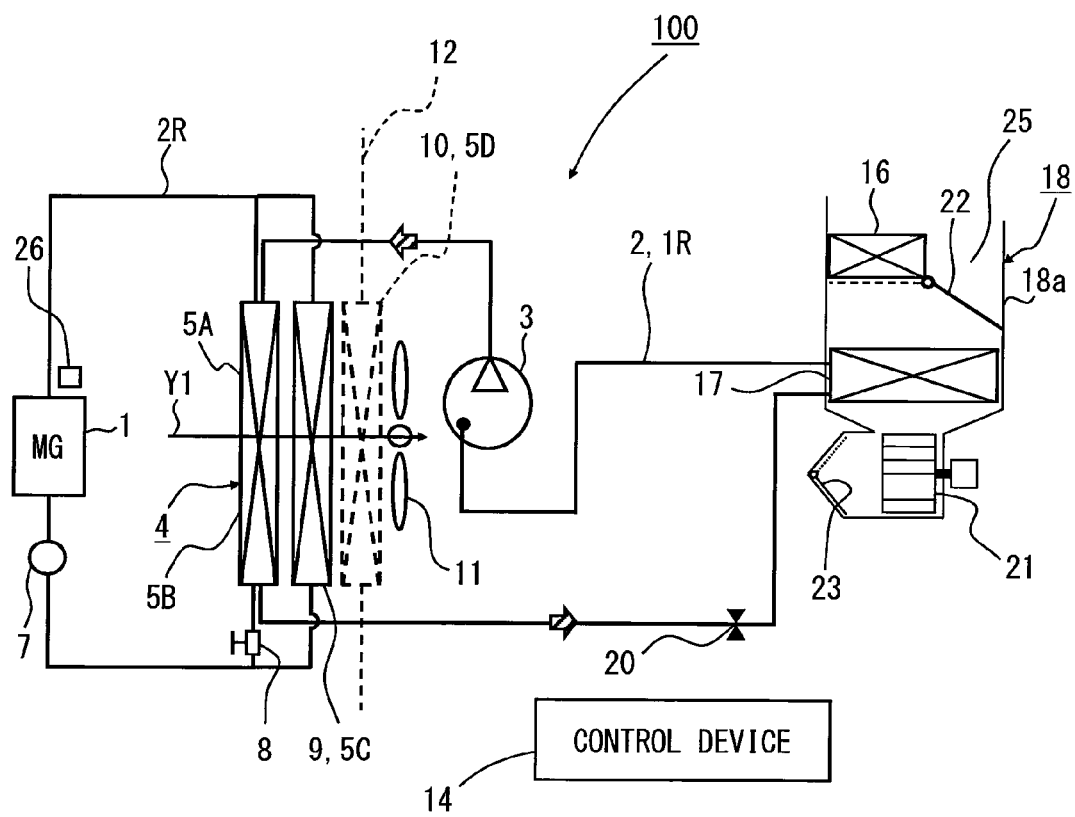
FIG. 1 is a diagram illustrating a cooling circuit according to a first embodiment.

A plurality of embodiments for carrying out this disclosure will be described below with reference to the drawings. Portions corresponding to items, which have been described in the previous embodiment, may be denoted by the same reference numerals and the repeated description thereof may be omitted in each embodiment. When only a part of the structure of each embodiment is described, the other embodiment having been previously described can be applied to the other part of the structure.

Portions, of which the possibility of the combination has been specifically described clearly in each embodiment, can be combined with each other, and embodiments can also be partially combined with each other if a problem does not particularly occur in combination even though combination is not described clearly.

First Embodiment

A first embodiment of this disclosure will be described in detail below with reference to FIG. 1. FIG. 1 is an operational diagram of a cooling circuit illustrating the first embodiment of this disclosure. As shown in FIG. 1, a heat exchange system 100 is an apparatus that is mounted on a vehicle, which includes, for example, a traveling motor as a traveling drive source, such as an electric vehicle (EV), a hybrid vehicle (HV), or a plug-in hybrid vehicle (PHV). This apparatus cools a device (such as an inverter (not shown), a motor generator 1, and the like), and allows a cooling operation in a refrigerating cycle 2 of an air-conditioner cycle.

The refrigerating cycle 2 mainly forms a cooling circuit by a compressor 3, a three-fluid heat exchanger 4 including a radiator (condenser), and an evaporator 17. Hereinafter, this circuit is referred to as a first fluid circuit 1R. In this first fluid circuit 1R, a refrigerant flowing out of the compressor 3 passes through the three-fluid heat exchanger 4 and a cooling throttle 20, to cool air in a passenger compartment of the vehicle at the evaporator 17.

Meanwhile, a cooler circuit for the motor generator (MG) 1 includes: a path along which a coolant flows from the motor generator 1, which is a heat source, through a pump 7, a flow control valve 8, which is a passage switching unit, and a second heat exchanger 5B disposed in the three-fluid heat exchanger 4; and a path along which a coolant flows from the motor generator 1, which is a heat source, through the pump 7 and a low-temperature heat exchanger 9 (also called a third heat exchanger 5C). Hereinafter, this circuit is referred to as a second fluid circuit 2R.

Heat of a coolant for an engine (E/G) is radiated by an engine radiator 10 (also called a heat exchanger for an engine or a fourth heat exchanger 5D). The coolant for an engine flows in an engine cooler circuit 12. A blower 11 allows air, which cools the respective heat exchangers 5A, 5B, 5C, and 5D, to flow to the right from the left in FIG. 1.

In the circuit of FIG. 1, relative to the three-fluid heat exchanger 4 and other heat exchangers, the air for cooling flows in series, and the coolant for the motor generator 1, which is an internal fluid, flows in parallel. The engine cooler circuit 12 in which a coolant (LLC) for the engine radiator 10 flows is partially shown in FIG. 1.

Further, in this embodiment, the first heat exchanger 5A, which is a condenser of the refrigerating cycle 2, is present in the three-fluid heat exchanger 4. The second heat exchanger 5B that is a part of a cooler circuit for the motor generator 1 corresponding to a heat-emitting device, is also present in the three-fluid heat exchanger 4. Furthermore, the three-fluid heat exchanger 4 includes the third heat exchanger 5C, which radiates heat of the cooler circuit for the motor generator 1, on the leeward side. That is, the plurality of heat exchangers 5B, 5C which radiate the heat of the cooler circuit for the motor generator 1 are arranged in series in a blowing direction of the blower 11, and are separately arranged between the three-fluid heat exchanger 4 and the low-temperature heat exchanger 5C. The low-temperature heat exchanger (third heat exchanger) 5C is named in contrast to a high-temperature heat exchanger that is the engine radiator 10.

The heat exchangers 5B, 5C are low-temperature heat exchangers that cool the temperature-raised coolant flowing through the motor generator 1, and are provided, for example, behind a grill that is disposed on the front side in an engine room. Accordingly, the flow of air for heat exchange that the ram pressure caused by the travel of the vehicle and the blower 11 is supplied to the heat exchangers 5A, 5B disposed in the three-fluid heat exchanger 4, the third heat exchanger 5C disposed on the leeward side, and the engine radiator 10.

The flow of air cools the coolant (also called LLC) inside the three-fluid heat exchanger 4. Accordingly, since the flow of air absorbs heat from the coolant during the exchange of heat in the three-fluid heat exchanger 4, the temperature of the flow of air is raised by the absorbed heat amount.

There is a case in which a cooler circuit of the second fluid circuit 2R needs to radiate the amount of heat about double the amount of heat, which is radiated at a normal time, when the amount of radiated heat is maximum. When the amount of radiated heat is maximum, the radiation amount required by a vehicle may not be completely achieved. However, in this embodiment, the heat exchanger 5A of the air-conditioner cycle (condenser 5A that serves as an outdoor unit of a vehicle air conditioner) can radiate heat in that case.

The three-fluid heat exchanger 4 is a combined heat exchanger including the heat exchanger 5A corresponding to a condenser, which serves as an outdoor unit of the vehicle air conditioner, and the heat exchanger 5B. The heat exchangers 5A, 5B are thermally and mechanically connected to each other by outer fins that form a part of a core. Meanwhile, the three-fluid heat exchanger 4 configured of the combined heat exchanger is ideally produced with a two-row core.

When a heat radiation request of a heat radiation circuit for the heat-emitting device (motor generator 1) is little, the entire heat radiation request can be satisfied by the independent low-temperature heat exchanger 5C. When the heat radiation request is little, a heat radiation circuit for the condenser 5A disposed in the three-fluid heat exchanger 4 can sufficiently radiate heat in the three-fluid heat exchanger 4. Accordingly, the performance of the condenser 5A is improved, so that, for example, air in the passenger compartment of the vehicle can be rapidly cooled.

Here, in a situation in which the heat radiation request of the cooler circuit 2R for the motor generator 1 is maximum, the heat exchange system can be controlled to radiate heat by the low-temperature heat exchangers 5B, 5C and to radiate the rest of heat by the condenser 5A that is disposed in the three-fluid heat exchanger 4. In this case, the performance of the condenser 5A deteriorates. However, since the frequency of this situation is low, there is no problem.

Accordingly, since the heat of the second fluid circuit 2R can be radiated by the three-fluid heat exchanger 4 (including the heat exchangers 5A and 5B), it is also possible to cope with a case in which the maximum heat radiation request is present, and the size of the low-temperature heat exchangers 5B, 5C can be maintained small.

This control can be performed by the flow control valve (flow rate control valve) 8 that includes ON/OFF valves disposed at a fluid inlet port of the three-fluid heat exchanger 4. The flow control valve 8 is controlled by a control device 14. Meanwhile, a wire between the flow control valve 8 and the control device 14 is not shown. For example, when a temperature sensed by a temperature sensor 26 disposed at an inlet of the motor generator 1 reaches a predetermined temperature, the flow control valve 8 disposed at the inlet of the three-fluid heat exchanger 4 is opened. At this time, the rotation speed of the pump 7 may be controlled.

Figure 2:
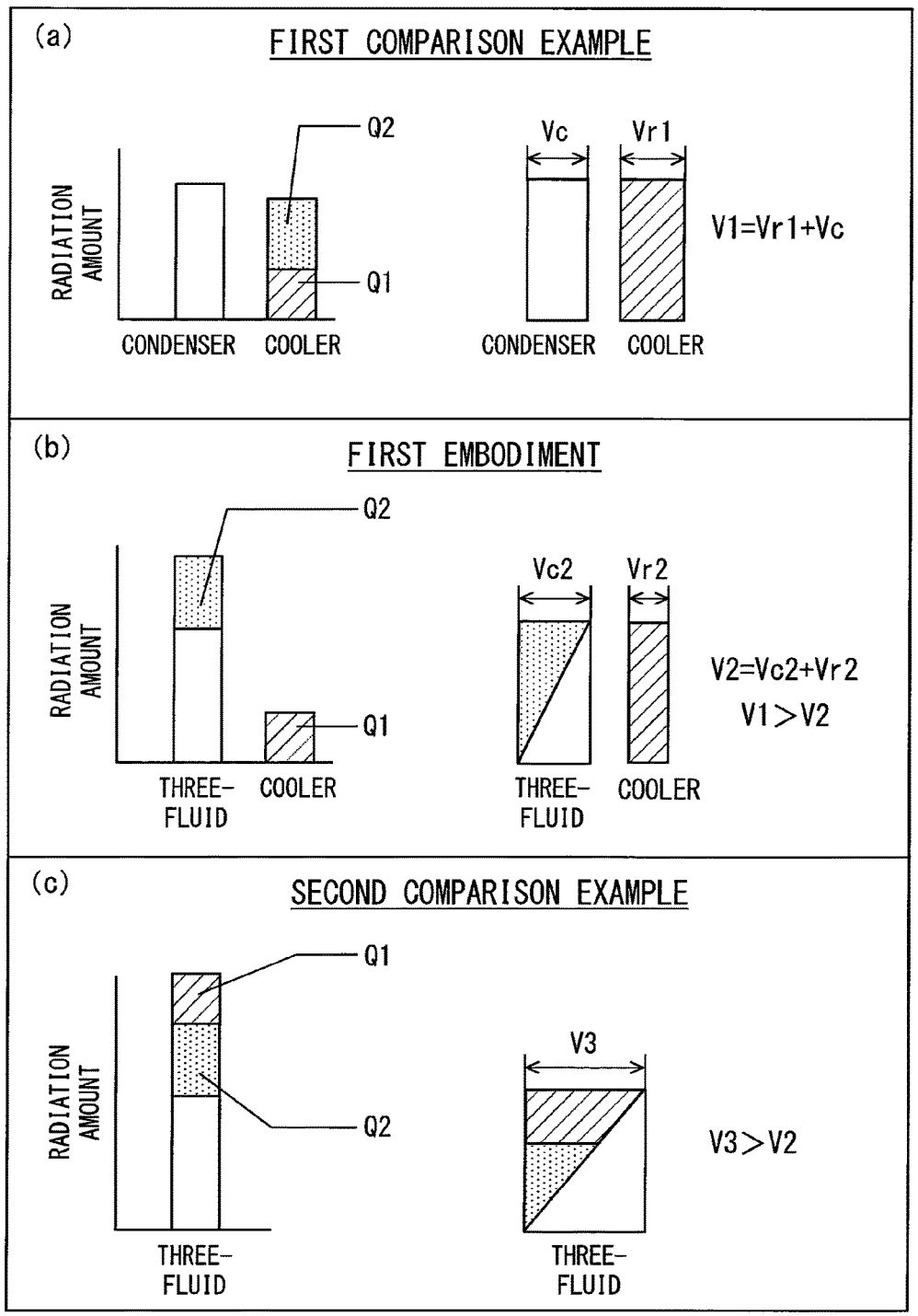
FIG. 2 is a diagram illustrating the operation of the cooling circuit of the first embodiment through a comparison with the operation of cooling circuits of comparison examples.

The effects of the three-fluid heat exchanger 4 will be described below together with first and second comparison examples with reference to FIG. 2. As described above, the three-fluid heat exchanger 4 is a combined heat exchanger including the heat exchanger 5A corresponding to a condenser, which serves as an outdoor unit of the vehicle air conditioner, and the heat exchanger 5B. Meanwhile, a first comparison example does not include the three-fluid heat exchanger 4, and heat of devices other than an engine is radiated by only a cooler (radiator) that is configured of a low-temperature heat exchanger (heat exchanger 5C).

In the case of the first comparison example, as shown in FIG. 2(a), the cooler configured of the low-temperature heat exchanger should radiate both the amount Q1 of heat that has a high occurrence frequency and the amount Q2 of heat that has a low occurrence frequency. The amount Q1 of heat, which has a high occurrence frequency, is the amount of heat that is to be radiated and is necessary during a normal travel. Further, the amount Q2 of heat, which has a low occurrence frequency, is the amount of heat that is to be radiated and corresponds to heat generated by an inverter during a hill-climbing travel or heat generated by a supercharger during a high-speed travel.

In order to radiate both the amount Q1 of heat, which has a high occurrence frequency, and the amount Q2 of heat, which has a low occurrence frequency, by a single low-temperature heat exchanger (cooler), the heat radiation capacity of the heat exchanger needs to increase. However, in the case of the first comparison example, it is inevitable that the maximum temperature of a heating medium at the inlet of the low-temperature heat exchanger rises since the low-temperature heat exchanger takes charge of both the amount Q1 of heat that has a high occurrence frequency and the amount Q2 of heat that has a low occurrence frequency.

Further, as the maximum temperature of the heating medium at the inlet of the low-temperature heat exchanger rises, the physical size of the cooler increases as shown as an image in FIG. 2(a). Here, when the physical size of the cooler is denoted by Vr1 and the physical size of the heat exchanger 5A corresponding to a condenser is denoted by Vc, the total physical size V1 is equal to Vr1+Vc.

In contrast, according to the first embodiment, the low-temperature heat exchanger 5C takes charge of the amount Q1 of heat that has a high occurrence frequency, and the three-fluid heat exchanger 4 takes charge of the amount Q2 of heat that has a low occurrence frequency. As a result, the three-fluid heat exchanger 4 takes charge of the amount Q2 of heat that has a low occurrence frequency, and does not take charge of the amount Q1 of heat that has a high occurrence frequency.

Since the three-fluid heat exchanger 4 does not take charge of the amount Q1 of heat, which has a high occurrence frequency, in the first embodiment as described above, the temperature of the three-fluid heat exchanger 4 can be suppressed so as to be relatively low even when the heat of devices other than an engine is necessary to be radiated at the maximum. Further, when the amount of heat to be radiated from the heat exchanger 5A of the air-conditioner cycle (the condenser 5A that serves as an outdoor unit of the vehicle air conditioner) becomes the maximum in a midsummer day (even when the necessary performance of the condenser is most extreme), the amount Q2 of heat that has a low occurrence frequency can be sufficiently taken charge since there is a difference in the time for radiating heat.

Meanwhile, when the three-fluid heat exchanger 4 does not take charge of the amount Q2 of heat to be radiated, which has a low occurrence frequency, in the first embodiment, it goes without saying that the three-fluid heat exchanger 4 can show the entire capacity as the condenser 5A that serves as an outdoor unit of the vehicle air conditioner.

In the first embodiment, as shown as an image in FIG. 2(b), the physical size Vr2 of the low-temperature heat exchanger is smaller than the above-mentioned physical size Vr1. Meanwhile, as shown as an image in FIG. 2(b), the physical size Vc2 of the three-fluid heat exchanger 4 is larger than the physical size Vc of the condenser of FIG. 2(a). The total physical size V2 is denoted by Vc2+Vr2.

Further, when the total physical sizes are compared with each other, "V1>V2" is satisfied and the total physical size can be suppressed. Accordingly, a space-saving heat exchange system can be provided. The reason for this is that, in the first embodiment, the low-temperature heat exchanger radiates heat at a high temperature up to the limit of capacity and the three-fluid heat exchanger 4 takes charge of the amount of heat to be radiated, which has a low occurrence frequency, that is, the amount of heat exceeding the capacity.

When a comparison is made in a predetermined operation time period, the low-temperature heat exchanger of the first embodiment shown in FIG. 2(b) radiates heat at a high temperature close to the limit for a long time. In contrast, the occurrence frequency of the radiation of heat at a high temperature close to the limit is low in the first comparison example shown in FIG. 2(a). Accordingly, when the total physical sizes are compared with each other, "V1>V2" is satisfied and the total physical size in the first embodiment can be more suppressed than that in the first comparison example.

Incidentally, first, the concept of the three-fluid heat exchanger 4 is to make the effective heat transfer areas of the outer fins with respect to a first fluid and a second fluid variable when a difference is present between the temperature of a wall surface of a tube in which the first fluid flows and the temperature of a wall surface of a tube in which the second fluid flows. Second, the concept of the three-fluid heat exchanger 4 is to improve the heat radiation performance of a higher-temperature fluid by increasing the effective heat radiation area of the higher-temperature fluid, when the temperature of one fluid of the first and second fluids is lower.

If the three-fluid heat exchanger is made to also take charge of the radiation of heat of devices other than an engine, as shown in FIG. 2(c), by merely increasing the physical size of the three-fluid heat exchanger, the effective heat transfer area of the first fluid is reduced more than necessary when the temperature of the second fluid rises. Further, since the performance of a condenser that serves as an outdoor unit of the vehicle air conditioner deteriorates, the physical size V3 of the three-fluid heat exchanger should be increased (V3>V2).

Since the three-fluid heat exchanger 4 also takes charge of the radiation of heat as described above in a scene in which the amount of heat to be radiated from devices other than an engine is very large, the low-temperature heat exchanger 5C can cope with the amount of heat to be radiated without the increase in the physical size of the low-temperature heat exchanger 5C. Accordingly, space efficiency can be improved. Furthermore, the physical size of the low-temperature heat exchanger 5C can be suppressed by improving the space efficiency.

The physical size of the low-temperature heat exchanger 5C and the physical size of the three-fluid heat exchanger 4 are not in a trade-off relationship, that is, the increase in the physical size of the three-fluid heat exchanger 4 does not correspond to the suppression in the physical size of the low-temperature heat exchanger 5C. A necessary heat radiation function can be achieved by the increase in the physical size of the three-fluid heat exchanger 4 that is smaller than the increase in the physical size of the low-temperature heat exchanger 5C.

The reason for that is as follows: since the three-fluid heat exchanger 4 takes charge of the amount of heat to be radiated, which cannot be completely radiated and has a low occurrence frequency, as described above after heat is radiated up to the limit by the low-temperature heat exchanger 5C, the temperature of the three-fluid heat exchanger 4 is suppressed. As a result, a part of the heat of devices other than an engine can be radiated while satisfying the performance as a condenser of the vehicle air conditioner even though the increase of the physical size is suppressed. Further, a difference between a heat radiation timing in which cool-down is performed immediately after a person gets in a vehicle and the amount of heat to be radiated from a condenser of the vehicle air conditioner becomes a peak and a heat radiation timing in which a heat radiation request of devices other than an engine becomes maximum (during hill-climbing or a high-speed travel) also affects.

Modification of First Embodiment

In the first embodiment, the tubes of the condenser 5A and the tubes of the heat exchanger 5B are alternately disposed so as to be substantially uniformly cooled by the flow of air. However, since the three-fluid heat exchanger 4 is produced with a two-row core, a relationship between the heat exchanger 5B, which is a part of the low-temperature heat exchangers disposed in the three-fluid heat exchanger 4, and the condenser 5A can be freely designed. For example, the heat exchanger 5B may be disposed on the upstream side in the flow of air and the condenser 5A may be disposed on the downstream side in the flow of air. Of course, on the contrary, the condenser 5A may be disposed on the upstream side in the flow of air and the heat exchanger 5B may be disposed on the downstream side in the flow of air.

Further, the flow control valve 8 may be electrically controlled by a signal transmitted from the control device 14 through a wire (not shown), but can be self-controlled as a thermostat. Furthermore, heat sources, such as an inverter that forms a motor controller controlling the operation of a traveling motor, an exhaust gas recirculation device (EGR), an intercooler, a power steering, and a battery, may be applied instead of the motor generator that serves as a low-temperature heat source. Moreover, since a coolant can flow in predetermined regions inside these devices 1, the temperatures of the devices during the operation of the devices are adjusted (cooled) to a temperature, which is equal to or lower than a predetermined control temperature, by the flowing coolant.

Next, although including well-known items, other structures of a vehicle air conditioner configured of an air-conditioner cycle will be further described. In FIG. 1, a heater core 16 and an evaporator 17 through which an engine coolant passes are disposed in the passenger compartment of the vehicle (inside an instrument panel) as components of an indoor unit 18, and the compressor 3, the motor generator 1, and the like are provided in the engine room in which the traveling motor of the vehicle is received.

The compressor 3 is an electric fluid machine that is driven by an electric motor (not shown), compresses a refrigerant with a high temperature and a high pressure, and discharges the refrigerant, and is adapted to be capable of adjusting the amount of the refrigerant, which is to be discharged, according to an operational rotation speed. The operation of the compressor 3 and the amount of the refrigerant to be discharged from the compressor 3 are controlled by the control device 14.

The blower 11 allows airflow (air) for heat exchange to flow to the heat exchangers 5A, 5B, 5C and the engine radiator 10 in a direction of an arrow Y1. The cooling throttle 20 is a pressure reducing unit, includes a throttle having a predetermined opening, and is adapted to reduce the pressure of a refrigerant flowing out of the heat exchanger 5A.

The evaporator 17 is adapted to cool air-conditioning air by exchanging heat between the refrigerant of which the pressure has been reduced by the cooling throttle 20 and the air-conditioning air that flows in an air-conditioning case 18a. The evaporator 17 is provided in the air-conditioning case 18a so as to cross all flow passages. The evaporator 17 is provided in the air-conditioning case 18a on the upstream side of the heater core 16 in the direction of air-conditioning airflow.

The indoor unit 18 is a unit that adjusts the temperature of the air-conditioning air to a set temperature, which is set by an occupant, and blows the air-conditioning air into the passenger compartment of the vehicle. The indoor unit 18 includes a blower 21, the evaporator 17, the heater core 16, an air-mix door 22, and the like that are provided in the air-conditioning case 18a. Reference numeral 23 denotes an inside/outside air switching door, and the inside/outside air switching door switches the introduction of outside air and the introduction of inside air (air present in the passenger compartment of the vehicle).

The blower 21 is a blowing unit that takes air-conditioning air into the air-conditioning case 18a from the inside or the outside of the passenger compartment of the vehicle and blows the air-conditioning air into the passenger compartment of the vehicle from various outlets positioned on the most downstream side. The operational rotation speed of the blower 21, that is, an air flow rate is controlled by the control device 14. The heater core 16 and the evaporator 17, which have been described above, are provided on the downstream side of the blower 21 in the direction of air-conditioning airflow. Further, a bypass flow passage 25, which allows the refrigerant to flow so as to bypass the heater core 16, is formed between the heater core 16 and the air-conditioning case 18a.

The air-mix door 22 is an adjusting part for adjusting the flow rate of the air-conditioning air passing through the heater core 16, which generates heat, and the bypass flow passage 25 by an engine coolant. The air-mix door 22 is an air-conditioning air flowing part for the heater core 16 or a rotary door that opens and closes the bypass flow passage 25. A ratio of the flow rate of heated air, which flows in the heater core 16, to the flow rate of cooled air, which is cooled by the evaporator 17 and flows through the bypass flow passage 25, is adjusted according to the opening of the air-mix door 22, so that the temperature of the air-conditioning air present on the downstream side of the heater core 16 is adjusted. The opening of the air-mix door 22 is controlled by the control device 14.

A downstream portion (upper portion in FIG. 1) of the heater core 16 of the indoor unit 18 is connected to a plurality of outlets (not shown) of the passenger compartment of the vehicle, and the air-conditioning air of which the temperature has been adjusted by the air-mix door 18 is blown into the passenger compartment of the vehicle from the selected outlets.

The control device 14 is a controller that includes a microcomputer and peripheral circuits thereof. The control device 14 performs an arithmetic operation according to a preset program. Further, various temperature signals that are sent from the temperature sensor 26, an outside air temperature sensor (not shown), and the like, a set temperature signal or the like, which is set by an occupant and sent from an operation panel (not shown), and the like are input to the control device 14.

Furthermore, the control device 14 controls the operation of the pump 7, the opening and closing of the flow control valve 8, the operation of the compressor 3, the amount of the refrigerant to be discharged from the compressor 3, the operations and the air flow rates of the blowers 11 and 21, the opening of the air-mix door 22, and the like on the basis of the result of the arithmetic operation.

The control device 14 operates the pump 7 in the second fluid circuit (cooler circuit) 2R. In this case, a coolant present in the cooler circuit 2R circulates through the motor generator 1, the pump 7, and the heat exchanger 5C or through the motor generator 1, the pump 7, the flow control valve 8, and the heat exchanger 5B in this order. Heat, which is generated by the operation of the motor generator 1, is radiated to the coolant, so that the motor generator 1 is cooled.

Further, the coolant absorbs heat from the motor generator 1 and the temperature of the coolant rises. Accordingly, when the temperature of the coolant detected by the temperature sensor 26 becomes equal to or higher than a predetermined coolant temperature (a predetermined cooling medium temperature), the control device 14 opens the side, which corresponds to the heat exchanger 5B, by the flow control valve 8. In this case, the coolant flows in the heat exchanger 5B and is also cooled by the condenser 5A that forms a radiator adjacent to or integrated with the heat exchanger 5B.

(Cooling Operation)

In the air-conditioner cycle 2, the refrigerant discharged from the compressor 3 circulates through the condenser 5A, the cooling throttle 20, the evaporator 17, and the compressor 3 in this order as shown by an arrow of FIG. 1. Since the heater core 16 is closed by the air-mix door 22 and the air-conditioning air present in the indoor unit 18 does not pass through the heater core 16, the engine coolant hardly radiates heat to the air-conditioning air in the heater core 16.

Further, after the refrigerant, which is cooled and flows out of the heat exchanger 5A (condenser) disposed in the three-fluid heat exchanger 4, is made to have low pressure and low temperature by the cooling throttle 20, the refrigerant flows into the evaporator 17. The air-conditioning air present in the indoor unit 18 is changed into cooled air by being cooled in the evaporator 17 by the refrigerant, and is blown into the passenger compartment of the vehicle from the outlets through the bypass flow passage 25. The control device 14 controls the amount of the refrigerant to be discharged from the compressor 3, the opening of the air-mix door 22, and the like so that the temperature of the air-conditioning air to be blown becomes the set temperature set by an occupant.

(Effects of First Embodiment)

In the first embodiment, the heat exchange system includes the heat exchanger 5A and the second fluid circuit (cooler circuit) 2R. The heat exchanger 5A serves as a radiator disposed in the first fluid circuit 1R forming the refrigerating cycle 2. The coolant for the motor generator 1, which serves as a heat-emitting device, flows in the second fluid circuit (cooler circuit) 2R. The radiation of the heat of the coolant of the cooler circuit 2R is separately performed by the plurality of low-temperature heat exchangers 5B, 5C that are disposed on the windward side and the leeward side in the flow direction of air that is allowed to flow by the blower 11.

The second heat exchanger 5B, which is one of the plurality of heat exchangers 5B, 5C, radiates heat by itself and also radiates heat through the condenser 5A that corresponds to a radiator of the refrigerating cycle 2. Further, a request for the heat radiation capacity of the cooler circuit for the motor generator 1 may considerably exceed a request for the heat radiation capacity at the normal time, but the occurrence frequency thereof is low. Accordingly, the request for the heat radiation capacity, which considerably exceeds the request for the heat radiation capacity at the normal time, can be satisfied using a heat radiation function of the condenser (first heat exchanger) 5A of the refrigerating cycle 2. Therefore, the sizes of the low-temperature heat exchangers 5B, 5C, which are required for the radiation of heat of the cooler circuit 2R, can be reduced.

In other words, the radiator 5A comprises an air-conditioning heat exchanger (condenser) that forms a part of the first fluid circuit 1R performing air-conditioning in the passenger compartment of the vehicle. Further, the second fluid circuit 2R comprises a cooler circuit for the motor generator 1 or the like, which serves as a heat-emitting device, other than an engine of the vehicle. Here, a scene is limited in which the amount of heat radiated from a cooler circuit, which forms the second fluid circuit 2R for the motor generator 1, becomes maximum. Accordingly, since the air-conditioning heat exchanger 5A is used to radiate heat in the scene in which the amount of heat radiated from the cooler circuit becomes maximum, the heat of the cooler circuit, which forms the second fluid circuit 2R for the motor generator 1, can be radiated by a small heat exchanger.

Furthermore, at least the first heat exchanger 5A, which forms the radiator, of the plurality of heat exchangers 5A and 5B is disposed on the windward side. Further, the second heat exchanger 5B, which radiates the heat of the cooler circuit at substantially the same position as the position of the first heat exchanger 5A in the flow direction of air passing through the first heat exchanger 5A, is disposed adjacent to or integrally with the radiator, that is, the first heat exchanger 5A.

Further, the third heat exchanger (low-temperature heat exchanger) 5C, in which the same coolant as the coolant flowing in the second heat exchanger 5B flows in at least a part thereof and which radiates the heat of the cooler circuit 2R, is disposed on the leeward side. Furthermore, the plurality of heat exchangers, which form the three-fluid heat exchanger 4, are configured of the first heat exchanger 5A and the second heat exchanger 5B.

According to this, since the first heat exchanger 5A forming the radiator is disposed on the windward side, the first heat exchanger 5A radiates heat first. Accordingly, heat can be radiated from the third heat exchanger 5C that radiates the heat of the cooler circuit to the air of which temperature has risen due to the heat radiated from the first heat exchanger 5A. Further, the plurality of heat exchangers 5A and 5B are configured of the three-fluid heat exchanger 4 that transfer heat to each other using a part of the core. According to this, the plurality of heat exchangers (the first and second heat exchangers 5A and 5B) can be integrated as the three-fluid heat exchanger 4 so as to be compact.

Furthermore, at least the second and third heat exchangers 5B, 5C are arranged in a manner that the coolant which serves as internal fluids of these heat exchangers flows in parallel with each other. Accordingly, a pressure loss of the entire cooler circuit is small, and the flow rate of the coolant in the heat exchangers can be increased.

In addition, the heat exchange system includes the flow control valve 8 that adjusts the flow rate of the coolant in the second heat exchanger 5B. Further, when the temperature sensor 26 regards that the temperature of the coolant reaches a temperature equal to or higher than a predetermined temperature, the flow control valve 8 is opened and heat is radiated not only in the third heat exchanger 5C but also in the second heat exchanger 5B.

Accordingly, only when necessary, heat is also radiated in the second heat exchanger 5B, such that the performance of the cooler circuit is improved. A chance in which the second heat exchanger 5B radiates heat is reduced. Accordingly, the radiation of heat from the first heat exchanger 5A, which radiates the heat of the cooler circuit at substantially the same position as the position of the second heat exchanger 5B in the flow direction of air, becomes good, so that the performance of the cooling performed by the evaporator 17 is improved.

Further, the operation of the three-fluid heat exchanger 4 (heat exchangers 5A and 5B) is achieved by the operation of the heat exchanger 5A, which works as a condenser at the time of cooling, and the operation of the heat exchanger 5B. In this case, as the amount of heat radiated from the heat exchanger 5B becomes smaller, the performance of the three-fluid heat exchanger 4 as the condenser 5A becomes higher, so the power-saving effect of the compressor 3 is great.

Furthermore, particularly, a heat-generating scene of an in-vehicle electronic device (for example, an inverter or a motor) is very limited, and the amount of generated heat in the heat-generating scene is quite large although not as much as the engine. Considering this situation, the three-fluid heat exchanger 4 can exhibit the performance at the maximum by radiating heat at the radiator configured of the heat exchanger 5C disposed on the leeward side in the flow direction of air when the amount of radiated heat is small.

Meanwhile, when the three-fluid heat exchanger 4 also takes charge of the radiation of heat in a heat-generating scene in which the amount of generated heat is very large, the low-temperature heat exchanger 5C can cope with the amount of heat to be radiated without the increase in the physical size of the low-temperature heat exchanger 5C. Accordingly, space efficiency can be improved, so that space-saving can be compatible with power-saving. In this case, the reason why the three-fluid heat exchanger 4 is disposed on the windward side is to prevent the three-fluid heat exchanger 4 from being affected by heat that is radiated from the heat exchanger 5C.

Second Embodiment

Figure 3:
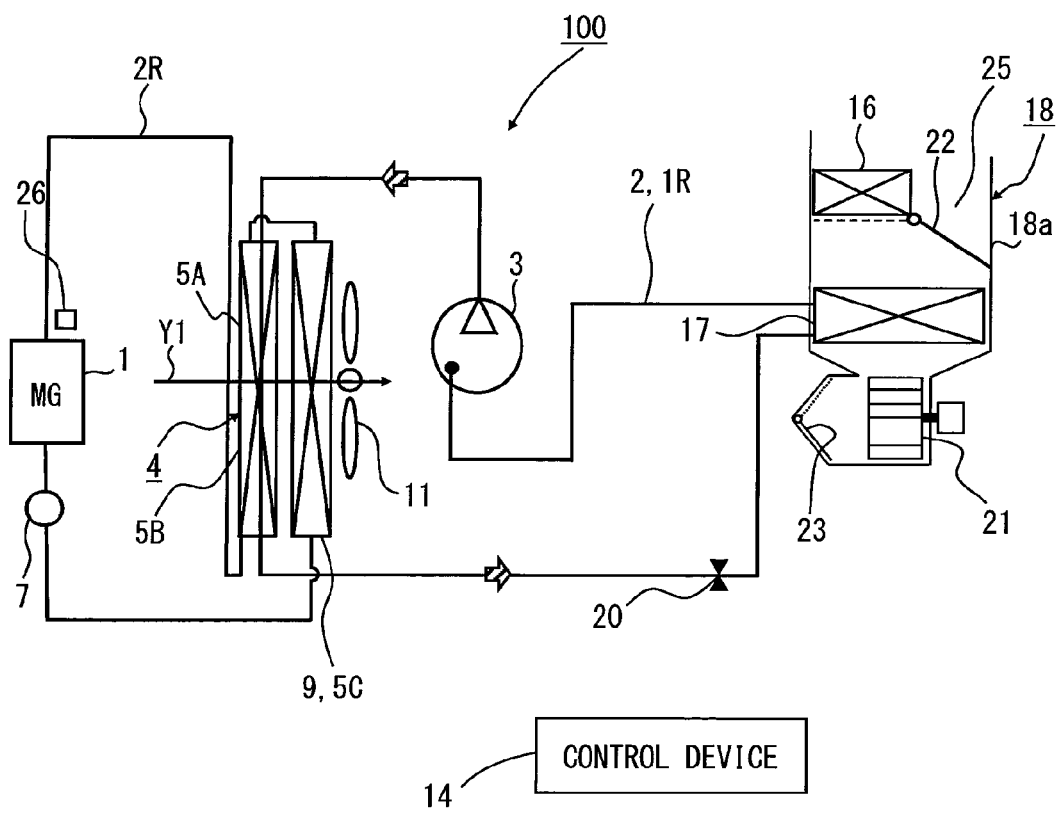
FIG. 3 is a diagram illustrating a cooling circuit according to a second embodiment.

Next, a second embodiment of this disclosure will be described with reference to FIG. 3. In the following embodiments, the same elements as those of the above-mentioned first embodiment are denoted by the same reference numerals and the detailed description thereof will be omitted and other structures and features will be described. Further, the same reference numerals as the reference numerals of the first embodiment denote the same structures in the second embodiment and other embodiments, and preceding description will be applied to the same structures. FIG. 3 is different from FIG. 1 in that the second heat exchanger 5B and the third heat exchanger 5C are connected in series or parallel to each other, and the coolant for the motor generator MG flows in parallel in FIG. 1 and flows in series in FIG. 3.

FIG. 3 is an operational diagram of a cooling circuit illustrating a second embodiment of this disclosure. In FIG. 3, a refrigerating cycle 2 forms a cooling circuit by a compressor 3, a heat exchanger 5A corresponding to a condenser, a cooling throttle 20, and an evaporator 17. This cooling circuit forms a first fluid circuit 1R. A second fluid circuit 2R forms a cooler circuit by a heat source 1, a pump 7, a heat exchanger 5C, and a heat exchanger 5B. The heat exchangers 5B, 5C are in a relationship in which air flows in series and internal fluid also flows in series. The heat exchangers 5A and 5B form a three-fluid heat exchanger 4 together. The heat exchangers 5A and 5B are connected to each other at outer fins and transfer heat to each other. The heat exchangers 5A and 5B are ideally produced with a two-row core.

At least the first heat exchanger 5A corresponding to a radiator (condenser), of the plurality of heat exchangers 5A and 5B, is disposed on the windward side in the second embodiment as described above. The second heat exchanger 5B, which radiates the heat of the cooler circuit at substantially the same position as the position of the first heat exchanger 5A in the flow direction of air passing through the first heat exchanger 5A, is disposed adjacent to or integrally with the radiator. The third heat exchanger 5C, in which the same coolant as the coolant flowing in the second heat exchanger 5B flows and which radiates the heat of the motor generator 1 serving as a heat source, is disposed on the leeward side.

According to this, since the first heat exchanger 5A corresponding to the radiator is disposed on the windward side, the first heat exchanger 5A radiates heat first. Accordingly, heat can be radiated from the third heat exchanger 5C that radiates the heat of the cooler circuit 2R to the air of which temperature has risen due to the heat radiated from the first heat exchanger 5A. Meanwhile, the heat exchangers 5A and 5B may be harmoniously integrated so that a relationship in which one of the heat exchangers 5A and 5B is disposed on the windward side and the other thereof is disposed on the leeward side is not satisfied.

A plurality of heat exchangers or the first and second heat exchangers 5A and 5B can be integrated as the three-fluid heat exchanger so as to be compact. Further, the coolant of the second and third heat exchangers 5B, 5C, which serves as internal fluid of these heat exchangers, flows in series. Accordingly, since the radiation of the heat of the second fluid circuit 2R, which forms a cooler circuit, can be performed by the flows of fluid that face each other in the flow direction of air as a counter flow, a great heat-radiation effect can be expected.

Furthermore, as for the flow of the internal fluid flowing in the second and third heat exchangers 5B, 5C in series, the third heat exchanger 5C corresponds to the upstream side in the flow direction of the internal fluid and the second heat exchanger 5B corresponds to the downstream side in the flow direction of the internal fluid. Accordingly, since the internal fluid, of which heat is radiated by the third heat exchanger 5C and the temperature has been lowered, flows into the second heat exchanger 5B, the temperature of the second heat exchanger 5B is lowered. Therefore, the heat dissipation performance of the first heat exchanger 5A, which radiates the heat of the first fluid circuit at substantially the same position as the position of the second heat exchanger 5B in the flow direction of air, can be improved according to the lowering in the temperature.

Third Embodiment

Figure 4:
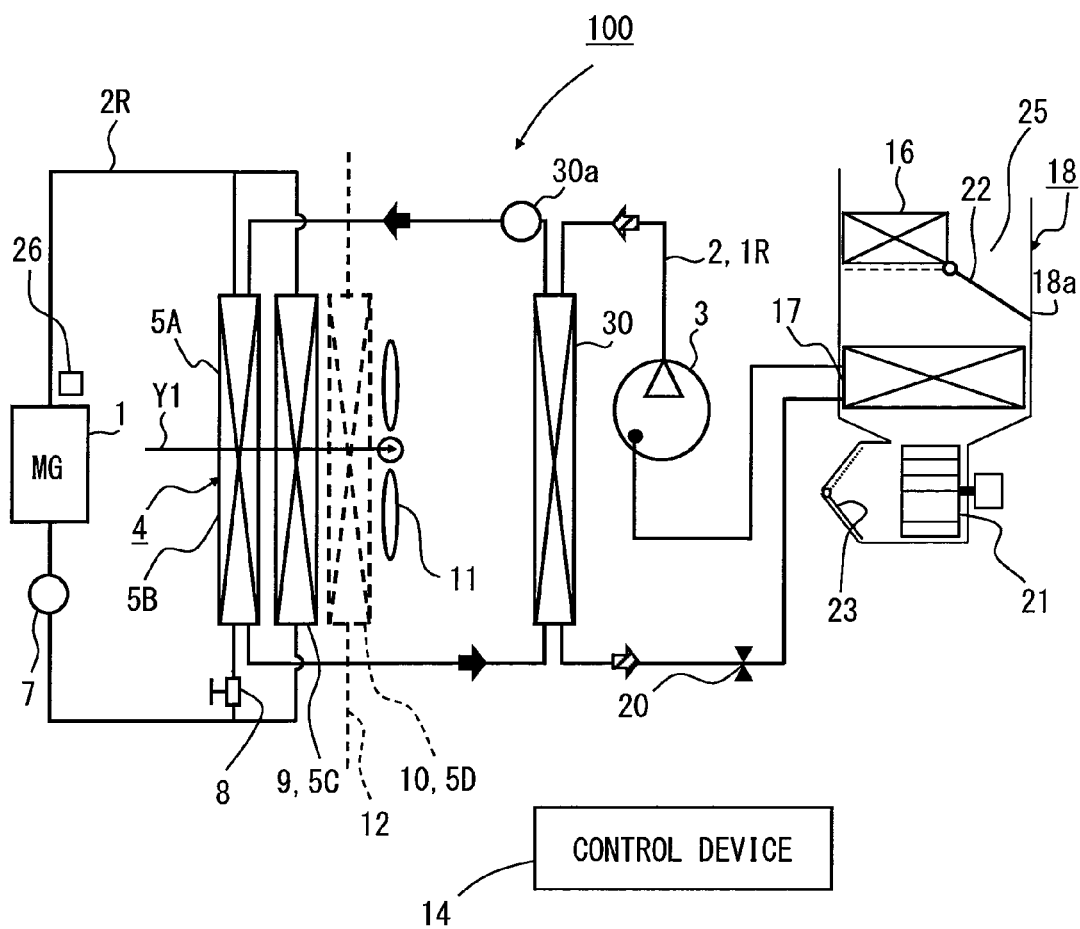
FIG. 4 is a diagram illustrating a cooling circuit according to a third embodiment.

Next, a third embodiment of this disclosure will be described with reference to FIG. 4. Features different from those of the above-mentioned embodiments will be described. FIG. 4 is different from FIG. 1 in that a liquid-cool condenser 30 and a brine pump 30a are disposed between a compressor 3 and a three-fluid heat exchanger 4 to form a circuit of an independent coolant (which is called brine in this disclosure) that relays the transfer of heat. While a coolant (LLC) and a refrigerant are used as fluid flowing in the three-fluid heat exchanger 4 in the case of FIG. 1, fluid flowing in the three-fluid heat exchanger 4 can be unified by a coolant (LLC) in the case of FIG. 4. Accordingly, the design and manufacture (including examination) of the three-fluid heat exchanger 4 are facilitated. That is, different countermeasures against pressure or corrosion are required for the refrigerant and the coolant, but manufacture and the like are facilitated when the same coolant is used as the internal fluids of the three-fluid heat exchanger 4.

FIG. 4 is an operational diagram of a cooling circuit illustrating a third embodiment of this disclosure. A refrigerating cycle using the liquid-cool condenser 30 is provided in FIG. 4. This refrigerating cycle forms a cooling circuit by a compressor 3, a liquid-refrigerant heat exchanger forming the liquid-cool condenser 30, a cooling throttle 20, and an evaporator 17. Further, a second fluid circuit (cooler circuit)

2R is formed by a motor generator 1 that serves as a heat source, a pump 7, a flow control valve 8, and a heat exchanger 5B.

Furthermore, the second fluid circuit 2R also forms a cooler circuit by the heat source 1, the pump 7, and a heat exchanger 5C. The heat exchangers 5B, 5C of the second fluid circuit 2R are in a relationship in which air flows in series and LLCs, which serve as internal fluids, flow in parallel. However, the internal fluid may flow in series.

The heat exchangers 5A and 5B form the three-fluid heat exchanger 4 together. The heat exchangers 5A and 5B are connected to each other at outer fins. Further, the heat exchangers 5A and 5B are ideally produced with a two-row core.

At least the first heat exchanger 5A, which forms a radiator, of the plurality of heat exchangers 5A and 5B is disposed on the windward side in the third embodiment as described above. Furthermore, the second heat exchanger 5B, which radiates the heat of the cooler circuit at substantially the same position as the position of the first heat exchanger 5A in the flow direction of air passing through the first heat exchanger 5A, is disposed adjacent to or integrally with the radiator. Moreover, a third heat exchanger 5C, in which the same coolant as the coolant flowing in the second heat exchanger 5B flows in at least a part thereof and which radiates the heat of the cooler circuit, is disposed on the leeward side.

According to this, since the first heat exchanger 5A forming the radiator is disposed on the windward side, the first heat exchanger 5A radiates heat first. Accordingly, heat can be radiated from the third heat exchanger 5C that radiates the heat of the cooler circuit to the air of which temperature has risen due to the heat radiated from the first heat exchanger 5A.

Next, a refrigerant, which has been compressed by the compressor 3, is cooled by the liquid-cool condenser 30, and the first heat exchanger 5A, which serves as the radiator radiating the heat of the brine flowing in the liquid-cool condenser 30, is provided. Accordingly, in not only a refrigerating cycle using an air-cool condenser but also the refrigerating cycle 2 using the liquid-cool condenser, a request for heat radiation capacity, which considerably exceeds a request for heat radiation capacity at a normal time, can be satisfied using a heat radiation function of the radiator (first heat exchanger 5A) of the refrigerating cycle 2. Therefore, the sizes of the heat exchangers 5B, 5C, which radiate only the heat of the cooler circuit 2R, can be reduced.

Fourth Embodiment

Figure 5:
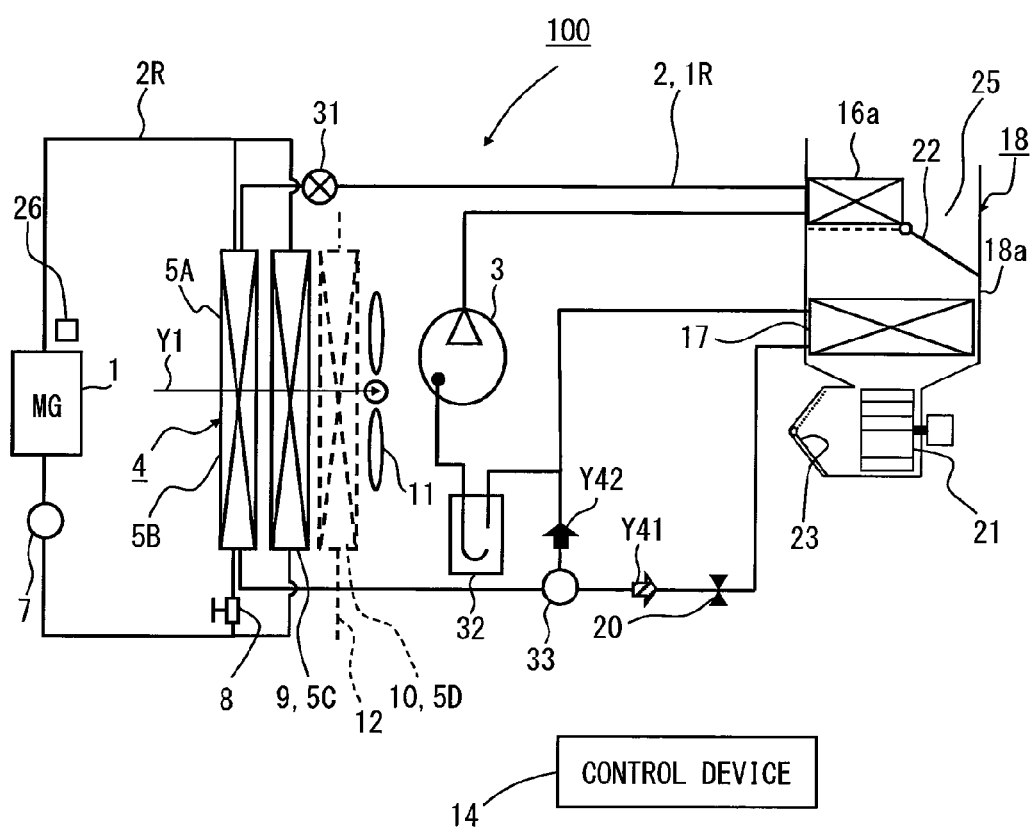
FIG. 5 is a diagram illustrating a heat pump cycle according to a fourth embodiment.

Next, a fourth embodiment of this disclosure will be described. Features different from those of the above-mentioned embodiments will be described. FIG. 5 is an operational diagram of a heat pump cycle illustrating a fourth embodiment of this disclosure. In FIG. 5, a first fluid circuit 1R of a refrigerating cycle 2 forms a heat pump cycle.

A second fluid circuit 2R forms a cooler circuit by a heat source 1, a pump 7, a flow control valve 8, and a heat exchanger 5B. Further, the cooler circuit is also formed by the heat source 1, the pump 7, and a heat exchanger 5C. The heat exchangers 5B, 5C are in a relationship in which air flows in series and internal fluids flow in parallel. Meanwhile, internal fluids of the heat exchangers 5B, 5C may flow in series as in a type III of FIG. 14 to be described below.

The heat exchangers 5A and 5B form a three-fluid heat exchanger 4 together. The heat exchangers 5A and 5B are connected to each other at outer fins. Further, the heat exchangers 5A and 5B are ideally produced with a two-row core.

Other structures will be described below. An outdoor heat exchanger of the heat pump cycle is configured of the heat exchanger 5A disposed in the three-fluid heat exchanger 4, and a control device 14 is provided. A unit, which performs air-conditioning (a cooling operation and a heating operation) in a passenger compartment of a vehicle by an indoor radiator 16a and an evaporator 17 forming a heat pump unit, is provided as an indoor unit 18.

Next, the heat pump cycle is a thermal cycle that performs heating or cooling in the passenger compartment of the vehicle. The heat pump cycle includes a cooling throttle 20 and the evaporator 17, which are provided on a branch passage branching from a three-way valve 33 and extending in a direction of an arrow Y41, in addition to a compressor 3, the indoor radiator 16a, an electric expansion valve 31, a first heat exchanger 5A that serves as an outdoor heat exchanger, and an accumulator 32.

Among the respective devices that form the heat pump cycle, the indoor radiator 16a and the evaporator 17 are provided in an air-conditioning case 18a, which is disposed in the passenger compartment of the vehicle (inside an instrument panel), as components of the indoor unit 18. The compressor 3, the heat exchangers 5A, 5B, 5C, and 5D, a blower 11, a motor generator 1, and the like are provided in an engine room in which a traveling motor of the vehicle is received.

The compressor 3 is an electric fluid machine that is driven by an electric motor (not shown), compresses a refrigerant with a high temperature and a high pressure, and discharges the refrigerant, and is adapted to be capable of adjusting the amount of the refrigerant, which is to be discharged, according to an operational rotation speed. The operation of the compressor 3 and the amount of the refrigerant to be discharged from the compressor 3 are controlled by the control device 14.

The indoor radiator 16a is a radiation heat exchanger in which a refrigerant passage is formed, and is provided in the air-conditioning case 18a on the downstream side in the direction of air-conditioning airflow. The refrigerant, which is discharged from the compressor 3 and has high temperature and high pressure, flows in the refrigerant passage formed in the indoor radiator 16a, and the indoor radiator 16a radiates heat to air-conditioning air, which flows in the air-conditioning case 18a and passes through the indoor radiator 16a, and heats the air-conditioning air.

The electric expansion valve 31 functions as a pressure reducing unit that reduces the pressure of the refrigerant flowing out of the indoor radiator 16a by throttling a refrigerant passage. Further, the electric expansion valve 31 also has a function of opening the refrigerant passage, and is controlled by the control device 14.

Meanwhile, as known well, a heating throttle and an electromagnetic valve, which opens and closes a branch passage bypassing the heating throttle, can be provided instead of the electric expansion valve 31. The electromagnetic valve may be closed during a heating operation so that a refrigerant flowing out of the indoor radiator 16a flows through the heating throttle, is subjected to the reduction of pressure, and flows into the first heat exchanger 5A forming the three-fluid heat exchanger 4. Furthermore, the electromagnetic valve may be opened during a cooling operation so that a refrigerant flowing out of the indoor radiator 16a flows into the radiator 5A (first heat exchanger) forming an outdoor heat exchanger without being subjected to the reduction of pressure.

The first heat exchanger 5A serving as the outdoor heat exchanger is a heat exchanger that exchanges heat between the refrigerant, which flows out of the electric expansion valve 31, and outside air for heat exchange. The first heat exchanger 5A is provided in an engine room so as to be arranged on the upstream side of the heat exchanger 5C and an engine radiator 5D in the flow direction of the air for heat exchange. When a vehicle travels, traveling wind flows into these heat exchangers 5A, 5B, 5C, and 5D from a grill.

Since the refrigerant is made to have low pressure and low temperature when the refrigerant flows out of the electric expansion valve 31, which forms the heating throttle, during the heating operation, the first heat exchanger 5A functions as a heat exchanger for heat absorption (heat absorber) that absorbs heat from the air for heat exchange. Further, since the refrigerant has high pressure and high temperature without being subjected to the reduction of pressure when the refrigerant flows out of the electric expansion valve 31 that opens the flow passage during the cooling operation, the first heat exchanger 5A functions as a radiator that cools the refrigerant by the air for heat exchange.

The heat exchanger 5C, the engine radiator 5D, and the blower 11 for supplying the air for heat exchange are provided on the rear side of the first heat exchanger 5A in a longitudinal direction of the vehicle. The rotation speed of a fan of the blower 11 is increased or decreased by the control device 14, so that the flow rate of the air for heat exchange is adjusted. Meanwhile, the blower 11 may be a push-in type air supply unit that is provided on the front side of the three-fluid heat exchanger 4 in the longitudinal direction of the vehicle and supplies air for heat exchange to the rear side of the vehicle from the front side of the vehicle.

A flow passage, which is connected to the compressor 3 like the three-way valve 33 and the accumulator 32, is provided on an outlet side of the three-fluid heat exchanger 4. The three-way valve 33 can be switched to a case in which the three-way valve 33 closes the side corresponding to the branch passage by a valve provided therein so that a refrigerant flows through the cooling throttle (pressure reducing valve) 20 as shown by the arrow Y41, and a case in which the three-way valve 33 opens the side corresponding to the branch passage and closes the side corresponding to the cooling throttle 20 so that a refrigerant flows through the branch passage (accumulator 32) as shown by an arrow Y42. The three-way valve 33 forms a cooling/heating switching unit together with the electric expansion valve 31.

The opening and closing of the valve, which is provided in the three-way valve 33, are controlled by the control device 14. The cooling throttle 20 is a pressure reducing unit, and includes a throttle having a predetermined opening, and is adapted to reduce the pressure of the refrigerant flowing out of the first heat exchanger 5A, which is provided in the three-fluid heat exchanger 4, by the three-way valve 33.

The evaporator 17 is a heat exchanger that is provided on the downstream side of the cooling throttle 20, and is adapted to cool air-conditioning air by exchanging heat between the refrigerant of which the pressure has been reduced by the cooling throttle 20 and the air-conditioning air that flows in the air-conditioning case 18a. The evaporator 17 is provided in the air-conditioning case 18a so as to cross all flow passages. The evaporator 17 is provided in the air-conditioning case 18a on the upstream side of the indoor radiator 16a in the direction of air-conditioning airflow.

The accumulator 32 is a gas-liquid separating unit. The accumulator 32 receives the refrigerant that flows out of the first heat exchanger 5A through the three-way valve 33 or the refrigerant that flows out of the evaporator 17 through the cooling throttle 20, separates gas and liquid of the refrigerant, accumulates liquid refrigerant, and allows gas refrigerant and a small amount of liquid refrigerant (into which oil is blended), which is present near the bottom, to be sucked into the compressor 3.

The indoor unit 18 is a unit that adjusts the temperature of the air-conditioning air to a set temperature, which is set by an occupant, and blows the air-conditioning air into the passenger compartment of the vehicle. The indoor unit 18 includes a blower 21, the evaporator 17, the indoor radiator 16a, an air-mix door 22, and the like that are provided in the air-conditioning case 18a.

The blower 21 is a blowing unit that takes air-conditioning air into the air-conditioning case 18a from the inside or the outside of the passenger compartment of the vehicle and blows the air-conditioning air into the passenger compartment of the vehicle from various outlets positioned on the most downstream side. The operational rotation speed of the blower 21, that is, an air flow rate is controlled by the control device 14. The evaporator 17 and the indoor radiator 16a, which have been described above, are provided on the downstream side of the blower 21 in the direction of air-conditioning airflow. Further, a bypass passage 25, which allows the air-conditioning air to flow so as to bypass the indoor radiator 16a, is formed between the indoor radiator 16a and the air-conditioning case 18a.

The air-mix door 22 is an adjusting part that adjusts the flow rate of the air-conditioning air passing through the indoor radiator 16a and the bypass flow passage 25. The air-mix door 22 is an air-conditioning air flowing part for the indoor radiator 16a or a rotary door that opens and closes the bypass passage 25. A ratio of the flow rate of heated air, which flows in the indoor radiator 16a, to the flow rate of cooled air, which is cooled by the evaporator 17 and flows through the bypass passage 25, is adjusted according to the opening of the air-mix door 22, so that the temperature of the air-conditioning air present on the downstream side of the indoor radiator 16a is adjusted.

The opening of the air-mix door 22 is controlled by the control device 14. Furthermore, the control device 14 performs an operation for cooling the device and a cooling operation and a heating operation in the passenger compartment of the vehicle by controlling the operation of the pump 7, the opening and closing of the flow control valve 8, the operation of the compressor 3, the amount of the refrigerant to be discharged from the compressor 3, the opening of the electric expansion valve 31, the operation and the air flow rate of the blower 11, the opening and closing of the valve provided in the three-way valve 33, the operation of the blower 21, the opening of the air-mix door 22, and the like on the basis of the result of an arithmetic operation.

(Cooling Operation in Cooler Circuit)

Next, an operation based on the above-mentioned structure will be described. The control device 14 operates the pump 7 in the cooler circuit that forms the second fluid circuit 2R. In this case, the coolant present in the second fluid circuit 2R circulates through the motor generator 1, the pump 7, and the third heat exchanger 5C in this order.

Further, the coolant absorbs heat from the motor generator 1 and the temperature of the coolant rises. Accordingly, when the temperature of the coolant detected by the temperature sensor 26 becomes equal to or higher than a predetermined coolant temperature, the control device 14 opens the passage corresponding to the second heat exchanger 5B, by the flow control valve 8. In this case, the coolant circulates and flows through the second heat exchanger 5B, and the coolant is also cooled by the radiator 5A that is disposed in the three-fluid heat exchanger 4.

(Operation of Heat Pump Cycle and Indoor Unit)

The control device 14 opens the electric expansion valve 31, opens the passage corresponding to the cooling throttle 20 by the three-way valve 33, closes the passage corresponding to the accumulator 32, and operates the compressor 3 and the blower 11 in a cooling cycle of the heat pump cycle. Further, the control device 14 adjusts an opening by operating the blower 21 in the indoor unit 18 so as to close the indoor radiator 16a by the air-mix door 22 (as shown by a broken line of FIG. 5).

In the heat pump cycle, as shown by the arrow Y41 of FIG. 5, the refrigerant discharged from the compressor 3 circulates through the indoor radiator 16a, the electric expansion valve 31, the first heat exchanger 5A, the three-way valve 33, the cooling throttle 20, the evaporator 17, the accumulator 32, and the compressor 3 in this order.

Since the indoor radiator 16a is closed by the air-mix door 22 and the air-conditioning air present in the indoor unit 18 does not pass through the indoor radiator 16a, the refrigerant hardly radiates heat to the air-conditioning air in the indoor radiator 16a and passes through the indoor radiator 16a while having high temperature and high pressure. Further, since the electric expansion valve 31 is opened, the refrigerant, which flows out of the indoor radiator 16a and has high temperature and high pressure, flows into the three-fluid heat exchanger 4 without being subjected to the reduction of pressure at the electric expansion valve 31, and is cooled by radiating heat to the air for heat exchange by the first heat exchanger 5A.

Furthermore, after the refrigerant, which is cooled and flows out of the first heat exchanger 5A, is made to have low pressure and low temperature by the cooling throttle 20, the refrigerant flows into the evaporator 17. The air-conditioning air present in the indoor unit 18 is changed into cooled air by being cooled in the evaporator 17 by the refrigerant, and is blown into the passenger compartment of the vehicle from the outlets through the bypass passage 25. The control device 14 controls the amount of the refrigerant to be discharged from the compressor 3, the opening of the air-mix door 22, and the like so that the temperature of the air-conditioning air to be blown becomes a set temperature set by an occupant.

(Heating Operation)

As shown in FIG. 5, the control device 14 throttles a flow passage formed in the electric expansion valve 31, opens the side corresponding to the accumulator 32 by the three-way valve 33, closes the side corresponding to the cooling throttle 20, and operates the compressor 3 and the blower 11 in the heat pump cycle. Further, the control device 14 adjusts an opening by operating the blower 21 in the indoor unit 18 so as to close the bypass passage 25 by the air-mix door 22 (as shown by a solid line of FIG. 5).

In a heating cycle, the refrigerant discharged from the compressor 3 circulates through the indoor radiator 16a, the electric expansion valve 31, the first heat exchanger 5A forming the outdoor heat exchanger, and the three-way valve 33, the accumulator 32, and the compressor 3 in this order as shown by the arrow Y42 of FIG. 5.

Since the indoor radiator 16a is opened by the air-mix door 22 and the air-conditioning air present in the indoor unit 18 passes through the indoor radiator 16a, the air-conditioning air is changed into heated air by being heated by the refrigerant, which flows in the indoor radiator 16a and has high temperature and high pressure, and is blown into the passenger compartment of the vehicle from the outlets. The control device 14 controls the amount of the refrigerant to be discharged from the compressor 3, the opening of the air-mix door 22, and the like so that the temperature of the air-conditioning air to be blown becomes a set temperature set by an occupant.

Meanwhile, after the refrigerant, which flows out of the indoor radiator 16a, is made to have low pressure and low temperature by a heating throttle function of the electric expansion valve 31, the refrigerant flows into the first heat exchanger 5A and absorbs heat from the air for heat exchange. The refrigerant, which has absorbed heat from the air for heat exchange, is discharged to the indoor radiator 16a from the compressor 3 again, so that the absorbed heat is radiated to the air-conditioning air. Further, since the refrigerant does not flow in the evaporator 17 during the heating operation, the air-conditioning air merely passes through the evaporator 17 without being subjected to heat exchange.

As described above, in the fourth embodiment, the heat pump cycle capable of cooling and heating air in the passenger compartment of the vehicle is provided with the three-way valve 33 which serves as a switching unit for switching the heating cycle and the cooling cycle, and the electric expansion valve 31. The first heat exchanger 5A forming the radiator of the cooling cycle operates as a heat absorber and performs heat absorption and heating when a cycle is switched to the heating cycle. Accordingly, the sizes of the second and third heat exchangers 5B, 5C, which are required for the radiation of heat of the cooler circuit forming the second fluid circuit 2R, can be reduced even in the heat exchange system that performs heating and cooling by the heat pump cycle.

Furthermore, the first heat exchanger 5A, which operates as a radiator during the cooling cycle, operates as a heat absorber when a cycle is switched to the heating cycle. Further, when the heating cycle operates, the flow control valve 8 is opened so that the coolant flows in the second heat exchanger 5B. According to this, a heating operation can be performed while waste heat to be radiated by the second heat exchanger 5B is absorbed by the first heat exchanger 5A.

Meanwhile, as a modification of the fourth embodiment, the liquid-cool heat exchanger described in the third embodiment of FIG. 4 may be disposed between the electric expansion valve 31 and the three-fluid heat exchanger 4 to form an independent coolant (brine) circuit. In this case, as in the third embodiment, the three-fluid heat exchanger 4 can be formed as a heat exchanger in which only two kinds of coolants flow other than air.

Fifth Embodiment

Figure 6:
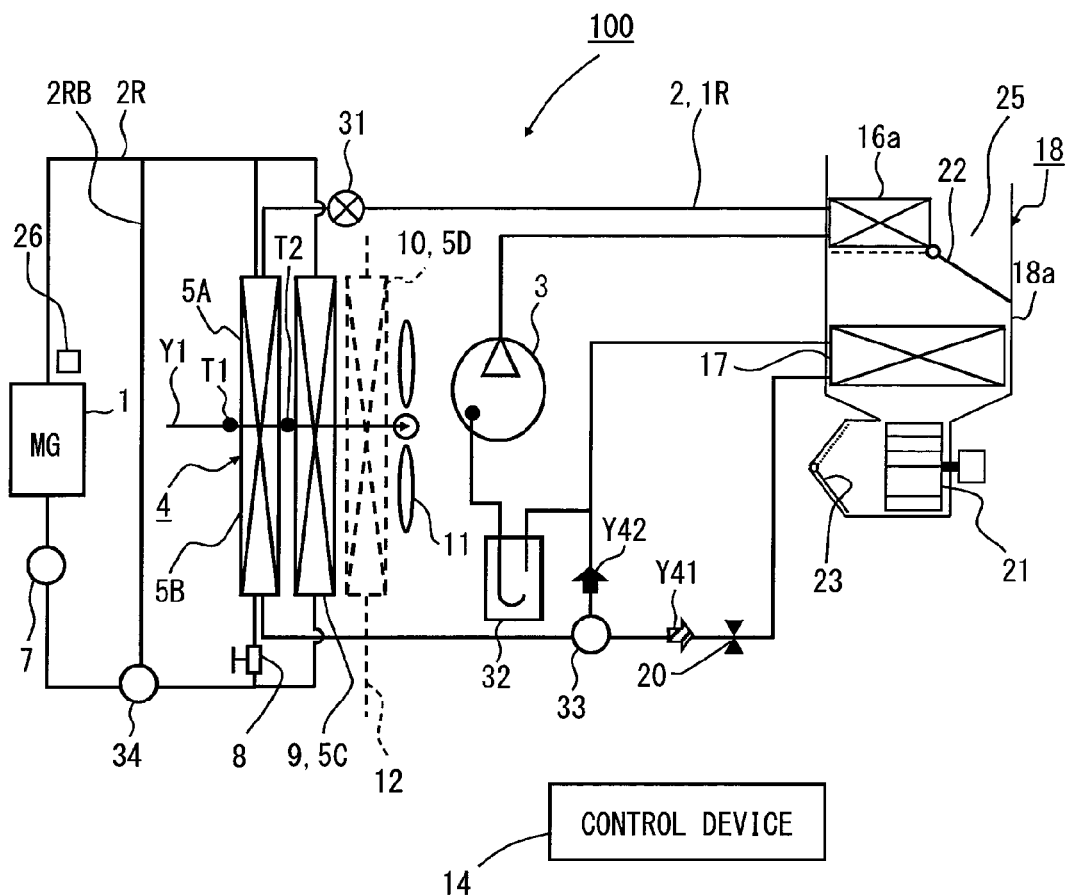
FIG. 6 is a diagram illustrating a heat pump cycle according to a fifth embodiment.

Next, a fifth embodiment of this disclosure will be described. Features different from those of the above-mentioned embodiments will be described. FIG. 6 is an operational diagram of a heat pump cycle illustrating a fifth embodiment of this disclosure, and a cooler circuit for a motor generator 1 is provided with a heat-storage bypass passage 2RB for defrosting.

In FIG. 6, a refrigerating cycle 2 is configured of a heat pump cycle that can cool and heat air in the passenger compartment of the vehicle, and includes a switching unit that switches a heating cycle and a cooling cycle. A first heat exchanger 5A forming a radiator of a cooling cycle operates as a heat absorber when a cycle is switched to the heating cycle. Accordingly, the sizes of the second and third heat exchangers 5B, 5C, which are required for the radiation of heat of a cooler circuit forming a second fluid circuit 2R, can be reduced even in a heat exchange system that performs heating and cooling by the heat pump cycle.

Further, when the heating cycle operates, the flow control valve 8 is opened so that a coolant flows in the second heat exchanger 5B. Accordingly, a heating operation can be performed while waste heat to be radiated by the second heat exchanger 5B is absorbed by the first heat exchanger 5A.

Furthermore, the cooler circuit is provided with the heat-storage bypass passage 2RB bypassing at least the second heat exchanger 5B, and a passage switching valve 34 that serves as a passage switching unit for switching the flow of coolant to the heat-storage bypass passage 2RB and the low-temperature heat exchangers 5B, 5C is provided. Further, the coolant, which has passed through the heat-storage bypass passage 2RB, is allowed to flow into the second heat exchanger 5B during the defrosting of the first heat exchanger 5A that serves as a heat absorber. According to this, since the coolant is allowed to flow to the second heat exchanger 5B when defrosting is performed, frost adhering to the heat absorber, which is configured of the first heat exchanger 5A disposed adjacent to or integrally with the second heat exchanger 5B, can be quickly removed.

Meanwhile, when defrosting is not performed, the passage switching valve 34, which forms the passage switching unit, allows the coolant to store heat by circulating the coolant through the heat-storage bypass passage 2RB. When defrosting is performed, the passage switching valve 34 stops the flow of coolant into the heat-storage bypass passage 2RB and allows the coolant, which has stored heat, to flow into the second heat exchanger 5B. Accordingly, the coolant, which has stored heat, can be allowed to immediately flow to the second heat exchanger 5B. Accordingly, when defrosting is performed, the defrosting of the heat absorber (first heat exchanger 5A), which is disposed adjacent to or integrally with the second heat exchanger 5B, can be performed by the coolant that has stored heat in the heat-storage bypass passage 2RB.

(Cooling Operation in Cooler Circuit)

Next, an operation of the fifth embodiment based on the above-mentioned structure will be described in more detail. The control device 14 opens the side corresponding to the heat-storage bypass passage 2RB by the passage switching valve 34, closes the sides corresponding to the heat exchangers 5B, 5C, and operates the pump 7 in the cooler circuit that forms the second fluid circuit (cooler circuit) 2R. In this case, the coolant present in the cooler circuit 2R circulates through the pump 7, the passage switching valve 34, the heat-storage bypass passage 2RB, the motor generator 1, and the pump 7 in this order. Heat, which is generated with the operation of the motor generator 1, is radiated to the coolant, so that the motor generator 1 is cooled.

Further, the coolant absorbs heat from the motor generator 1 and the temperature of the coolant rises. Accordingly, when the temperature of the coolant detected by the temperature sensor 26 becomes equal to or higher than a predetermined coolant temperature (which is a predetermined cooling medium temperature, and is for example, 65° C.), the control device 14 opens the sides, which correspond to the low-temperature heat exchangers 5B, 5C, by the passage switching valve 34, closes the side corresponding to the heat-storage bypass passage 2RB, and operates the blower 11.

In this case, the coolant flows through the low-temperature heat exchangers 5B, 5C and circulates in the cooler circuit 2R, and the coolant is cooled by the low-temperature heat exchangers 5B, 5C. When the temperature of the coolant is lower than the predetermined coolant temperature, the control device 14 opens the side corresponding to the heat-storage bypass passage 2RB by the passage switching valve 34 and closes the sides corresponding to the low-temperature heat exchangers 5B, 5C again. The motor generator 1 is adjusted (cooled) to a temperature, which is equal to or lower than a predetermined control temperature, by the repetition of this operation.

Meanwhile, the flow control valve 8 is initially closed so as to radiate the heat of the motor generator 1 at only the heat exchanger 5C. When heat cannot be sufficiently radiated by this radiation of heat, the flow control valve 8 is opened and heat may be radiated at the heat exchanger 5B disposed in the three-fluid heat exchanger 4. Since the cooling operation and the heating operation of the operations of the heat pump cycle and the indoor unit are the same as those of the fourth embodiment of FIG. 5, the description thereof will be omitted and a defrosting operation will be described.

(Defrosting Operation)

During the heating operation, the first heat exchanger 5A serving as the outdoor heat exchanger allows the refrigerant to absorb heat from the air for heat exchange. Accordingly, the temperature of the air for heat exchange is lowered by heat exchange. Further, when temperature of outside air is low as in winter and the temperature of the air for heat exchange becomes lower than the dew point of vapor contained in the air by heat exchange, vapor becomes condensed water. Furthermore, when the temperature of the air for heat exchange is lowered to a temperature equal to or lower than 0° C., condensed water freezes, becomes frost, and adheres to the surface of the first heat exchanger 5A (three-fluid heat exchanger 4).

When frost adheres to the surface of the first heat exchanger 5A, the air flow resistance of the entire three-fluid heat exchanger 4 increases and thermal resistance increases. Accordingly, the heat exchange performance of the three-fluid heat exchanger 4 deteriorates and the heating performance of the indoor radiator 16a eventually deteriorates. The defrosting operation is set as an operation for removing the frost by melting the frost.

At the time of the defrosting operation, first, the control device 14 opens the side corresponding to the heat-storage bypass passage 2RB by the passage switching valve 34, closes the sides corresponding to the low-temperature heat exchangers 5B, 5C, and operates the pump 7 in the cooler circuit 2R. In this case, since the coolant present in the cooler circuit 2R passes through the heat-storage bypass passage 2RB and circulates, the coolant is not affected by heat that is radiated from the three-fluid heat exchanger 4 and the low-temperature heat exchanger 5C. Accordingly, the heat generated from the motor generator 1 is sufficiently stored in the coolant.

Further, when defrosting is performed during the heating operation, the control device 14 opens the sides corresponding to the three-fluid heat exchanger 4 and the heat exchanger 5C (low-temperature heat exchanger 9) by the passage switching valve 34, closes the side corresponding to the heat-storage bypass passage 2RB, and further operates the blower 11. In this case, the coolant present in the cooler circuit 2R flows through the heat exchanger 5B disposed in the three-fluid heat exchanger 4 and circulates, and the heat stored in the coolant is supplied to the heat exchanger 5A (heat absorber) disposed adjacent to or integrally with the second heat exchanger 5B. As a result, defrosting is performed. Meanwhile, a three-way valve or the like may be provided instead of the flow control valve 8 so that the coolant having stored heat does not flow in the heat exchanger 5C at the time of the defrosting.

As shown in FIG. 6, for example, when the temperature of the air for heat exchange, which does not yet flow into the heat exchanger 5B, is denoted by T1, the temperature of the air for heat exchange, which has passed through the three-fluid heat exchanger 4 including the heat exchanger 5B, (temperature detected by the temperature sensor) rises to T2 by heating that is performed by the coolant having stored heat.

At this time, the control device 14 controls the air flow rate of the blower 11 so that the temperature T2 of the air for heat exchange becomes equal to or higher than a predetermined air temperature required for the defrosting of the three-fluid heat exchanger 4. Since a temperature equal to or higher than 0° C. is needed as the temperature T2 of the air for heat exchange that melts frost, the predetermined air temperature is set to 0° C. here.

The amount of heat discharged from the coolant is proportional to the product of the volume of the air for heat exchange and the temperature difference (temperature T2−temperature T1). Accordingly, for example, when the temperature T2 of the air for heat exchange is lower than a predetermined air temperature, the control device 14 ensures a temperature, which is equal to or higher than the predetermined air temperature, as the temperature T2 of the air for heat exchange by reducing the volume of air of the blower 11.

Further, the air for heat exchange, which has been heated up to the temperature T2, flows into the three-fluid heat exchanger 4, so that the defrosting of the three-fluid heat exchanger 4 can be performed. At this time, operating conditions of the heating operation can be maintained as they are in the heat pump cycle.

As described above, in the fifth embodiment, the coolant is allowed to flow in the heat-storage bypass passage 2RB by the passage switching valve 34 before defrosting in the defrosting operation, so that the heat generated from the motor generator 1 is stored in the coolant. Accordingly, heat required for defrosting the three-fluid heat exchanger 4 can be prepared.

Further, when defrosting is performed, the coolant having stored heat is allowed to flow in at least the heat exchanger 5B by the passage switching valve 34, and the blower 11 is operated. Accordingly, the heat of the coolant is transferred to the entire three-fluid heat exchanger 4 from the heat exchanger 5B, is further transferred to the air for heat exchange, and can raise the temperature of the air for heat exchange. Furthermore, the air for heat exchange of which the temperature has risen can be allowed to flow to the heat exchanger 5C that serves as the low-temperature heat exchanger 9 positioned on the downstream side and the heat exchanger 5D that forms the engine radiator 10.

Since the heat, which is previously stored in the coolant, can be applied to the three-fluid heat exchanger 4 through the air for heat exchange at this time, immediately effective defrosting can be performed. Further, in the related art, the blower 11 is needed to be stopped and the compressor 3 disposed in the heat pump cycle is needed to be operated during a hot gas defrosting operation.

However, in the fifth embodiment, during defrosting, the blower 11 continues operating and the first heat exchanger 5A disposed in the three-fluid heat exchanger 4 keeps operating as a heat absorber as in the heating operation. Accordingly, in the heat pump cycle, defrosting can be performed while an original heating operation state is maintained. Further, since the compressor 3 does not need to be operated for defrosting, extra power for the compressor 3 is not needed. Meanwhile, in the fifth embodiment of FIG. 6, internal fluids of the heat exchangers 5B, 5C may flow in series as in a type IV of FIG. 14 to be described below.

Sixth Embodiment

Figure 7:
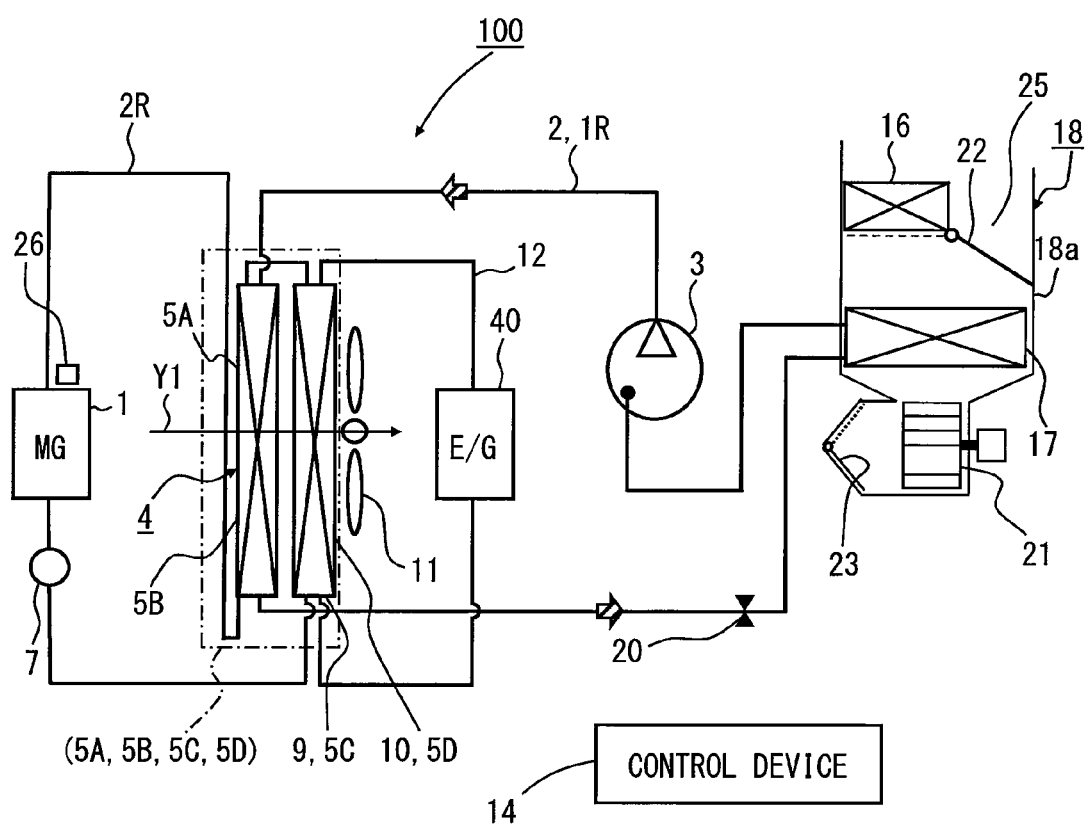
FIG. 7 is a diagram illustrating a cooling cycle according to a sixth embodiment.

Next, a sixth embodiment of this disclosure will be described. Features different from those of the above-mentioned embodiments will be described. In the sixth embodiment, a third heat exchanger 5C of FIG. 7 is integrated with an engine radiator 10 (fourth heat exchanger 5D) that radiates the heat of a coolant of an engine 40. The volume, which is occupied by the third heat exchanger 5C and the engine radiator 10 in the entire space of a heat exchanger, can be reduced by the integration.

FIG. 7 is an operational diagram of a cooling cycle illustrating a sixth embodiment of this disclosure. In FIG. 7, a refrigerating cycle forms a cooling circuit by a compressor 3, a first heat exchanger 5A forming a condenser, an evaporator 17, and the like. A first fluid circuit 2R forms a cooler circuit by a heat source 1, a pump 7, a heat exchanger 5C forming a low-temperature heat exchanger 9, and a heat exchanger 5B.

The heat exchangers 5B, 5C are in a relationship in which air flows in series and internal fluids flow in series. The heat exchangers 5A and 5B form a three-fluid heat exchanger 4 together. The heat exchangers 5A and 5B are connected to each other at outer fins. Further, the heat exchangers 5A and 5B are ideally produced with a two-row core.

The third heat exchanger 5C is integrated with an engine radiator 10 that serves as a fourth heat exchanger 5D of the cooler circuit for the engine 40. Accordingly, the third heat exchanger 5C is integrated with the fourth heat exchanger 5D configured of the engine radiator 10, so that reduction in size can be achieved.

Further, the third and fourth heat exchangers 5C and 5D are integrated as a three-fluid heat exchanger (5C and 5D) that transfer heat to each other using a part of the core. According to this, the third heat exchanger 5C is integrated with the fourth heat exchanger 5D as the three-fluid heat exchanger, so that reduction in size can be achieved.

As described above, the first and second heat exchangers 5A and 5B are integrated on the windward side as a first three-fluid heat exchanger (5A and 5B) that transfer heat to each other using a part of the core. Further, in this case, the third and fourth heat exchangers 5C and 5D are integrated on the leeward side as a second three-fluid heat exchanger (5C and 5D) that transfer heat to each other using a part of at least a common core. Two sets of three-fluid heat exchangers are disposed on the windward side and the leeward side in this way, so that the entire volume can be further reduced.

Modification of Sixth Embodiment

As described above, the first three-fluid heat exchanger (5A and 5B) is integrally formed on the windward side and the second three-fluid heat exchanger (5C and 5D) is integrally formed on the leeward side. However, the first three-fluid heat exchanger (5A and 5B) and the second three-fluid heat exchanger (5C and 5D) may be further integrated with each other. The integrated composite three-fluid heat exchanger (5A, 5B, 5C, 5D) is shown by a single-chain line of FIG. 7. All the heat exchangers 5A, 5B, 5C, and 5D are thermally and mechanically connected to each other by outer fins in the composite three-fluid heat exchanger (5A, 5B, 5C, 5D).

Other Embodiments

This disclosure is not limited to the above-mentioned embodiments, and can be modified or expanded as described below. For example, the three-fluid heat exchanger has been formed with a two-row core in the above-mentioned embodiments, but can be formed with a one-row core. Further, the heat exchangers 5A and 5B only have to be capable of transferring heat to each other. The heat exchangers 5A and 5B may be in a relationship in which the heat exchanger 5A is disposed on the windward side and the heat exchanger 5B is disposed on the leeward side in the flow direction of air, and may be in a reverse relationship. Furthermore, the heat exchangers 5A and 5B may be harmoniously integrated so that a relationship in which one of the heat exchangers 5A and 5B is disposed on the windward side and the other thereof is disposed on the leeward side is not satisfied.

Figure 8:
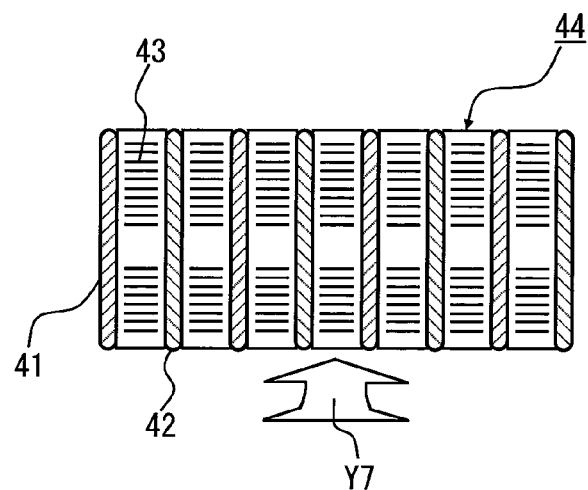
FIG. 8 is a schematic view illustrating an example of the arrangement of heat exchangers in a three-fluid heat exchanger, according to another embodiment.

FIG. 8 is a schematic view showing an example of the alternate arrangement of tubes of heat exchangers, which are disposed in a three-fluid heat exchanger, illustrating another embodiment. As shown in FIG. 8, the three-fluid heat exchanger is, for example, a combined heat exchanger that includes tubes 41 of a first heat exchanger 5A forming a condenser or a heat absorber serving as an outdoor unit of the vehicle air conditioner and tubes 42 of a second heat exchanger 5B forming a part of a low-temperature heat exchanger. A core 44 includes at least the tubes 41 and 42 and outer fins 43 that are cut and raised and bridge the tubes 41 and 42. The heat exchangers 5A and 5B are thermally connected to each other by the outer fins 43 that form a part of the core 44. An arrow Y7 represents air (air for heat exchange) that is allowed to flow by the blower 11.

Figure 9:
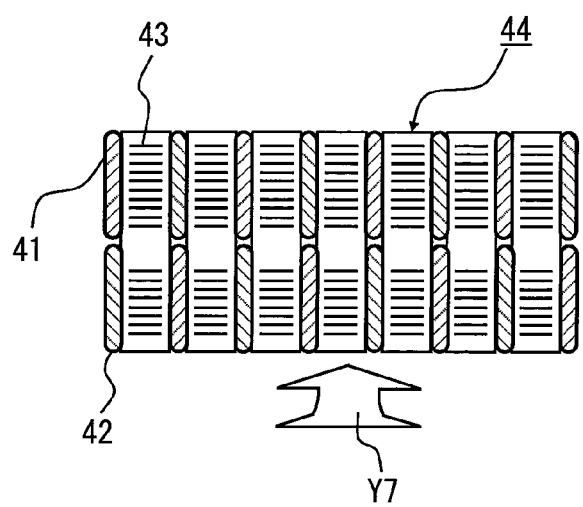
FIG. 9 is a schematic view illustrating another example of the arrangement of heat exchangers in a three-fluid heat exchanger, according to another embodiment.

Next, FIG. 9 is a schematic view showing an example of the zigzag arrangement of tubes of heat exchangers, which are disposed in the three-fluid heat exchanger, illustrating another embodiment. As shown in FIG. 9, tubes 41 of a first heat exchanger 5A, which forms a condenser or a heat absorber serving as an outdoor unit of the vehicle air conditioner, and tubes 42 of a second heat exchanger 5B, which forms a part of a low-temperature heat exchanger, are arranged in a zigzag pattern. The tubes 41 and 42 face each other in the direction of air Y7. Further, outer fins 43, which are cut and raised and bridge the tubes 41 and 42, are provided.

The heat exchangers 5A and 5B are thermally connected to each other by the outer fins 43 that form a part of the core 44. Meanwhile, the thermal connection between the heat exchangers 5A and 5B can be achieved by the contact between the tubes or the contact between tanks to which the tubes are connected. Furthermore, in this case, the core 44 is a metal part that includes the tubes, the outer fins, and the tanks.

Next, an example of the specific structure of a heat exchanger, which can be employed as the three-fluid heat exchanger of each of the above-mentioned embodiments, will be described as another embodiment.

Figure 10:
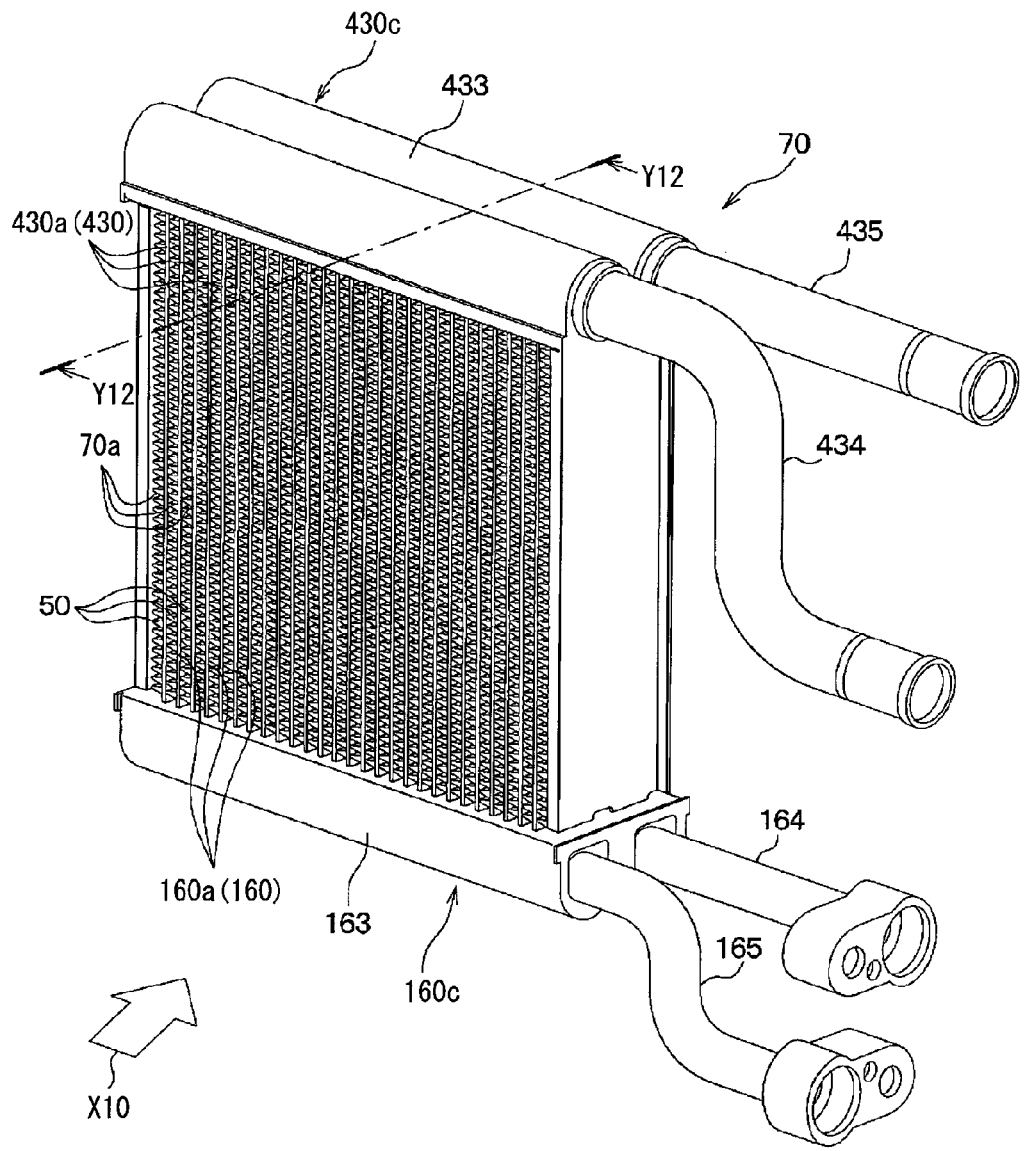
FIG. 10 is a perspective view illustrating a three-fluid heat exchanger according to another embodiment.
Figure 11:
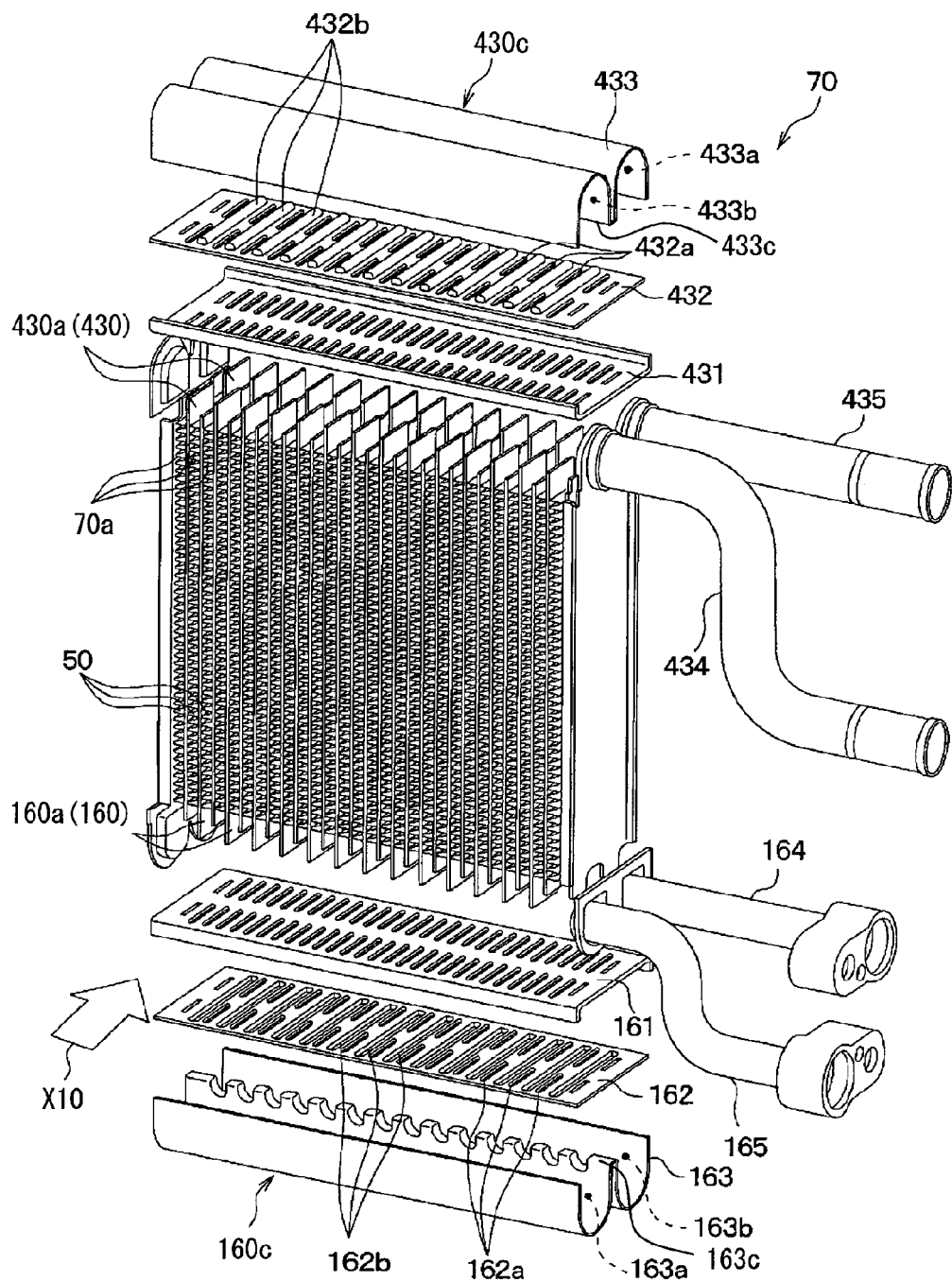
FIG. 11 is an exploded perspective view illustrating the heat exchanger of FIG. 10.
Figure 12:
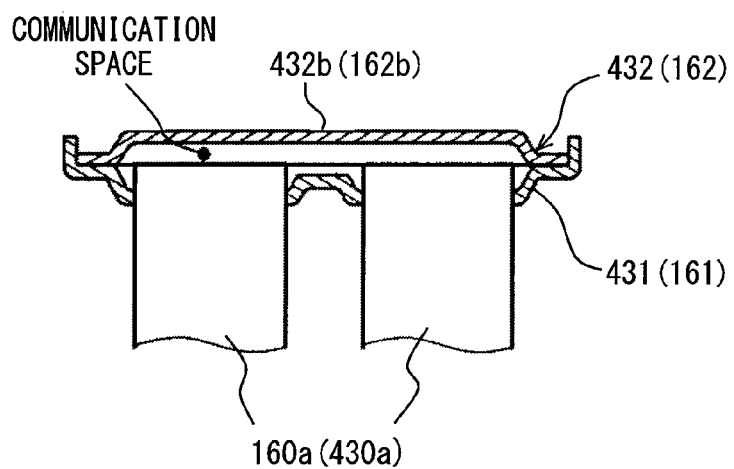
FIG. 12 is a cross-sectional view taken along line Y12-Y12 of FIG. 10.
Figure 13:
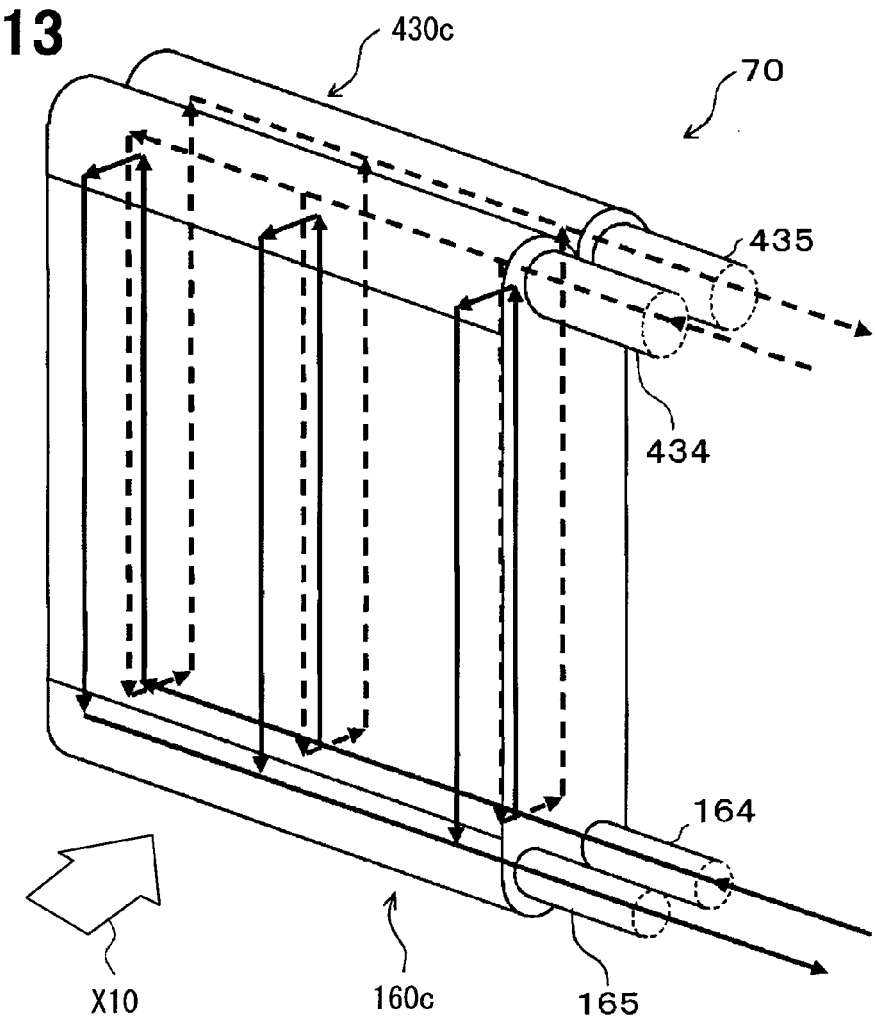
FIG. 13 is a schematic perspective view illustrating the flows of refrigerant and coolant in the heat exchanger of FIG. 10.

FIG. 10 is a perspective view illustrating a heat exchanger 70, FIG. 11 is an exploded perspective view of the heat exchanger 70, FIG. 12 is a cross-sectional view taken along line Y12-Y12 of FIG. 10, and FIG. 13 is a schematic perspective view illustrating the flow of refrigerant and the flow of coolant in the heat exchanger 70. Heat exchange media of the three-fluid heat exchanger may be air, refrigerant, and coolant, or heat exchange media of the three-fluid heat exchanger may be air, first coolant, and second coolant. Hereafter, the description is made in case in which heat exchange media of the three-fluid heat exchanger are air, refrigerant, and coolant. However, the following structure can also be applied to the case in which heat exchange media of the three-fluid heat exchanger are air, first coolant, and second coolant.

First, as shown in FIGS. 10 and 11, an outdoor heat exchange unit 160 forms a first heat exchanger 5A and a radiator unit 430 forms a second heat exchanger 5B. Each of the outdoor heat exchange unit 160 and the radiator unit 430 is formed by a so-called tank-and-tube type heat exchanger structure including a plurality of tubes that allow refrigerant or coolant to flow, a pair of tanks for collection and distribution that are disposed at both ends of the plurality of tubes and collect or distribute the refrigerant or the coolant flowing in the respective tubes, and the like.

More specifically, the outdoor heat exchange unit 160 is a heat exchange unit including a plurality of refrigerant tubes 160a in which a refrigerant serving as a first fluid flows, and a refrigerant-side tank portion 160c that extends in a stacking direction of the plurality of refrigerant tubes 160a and collects or distributes the refrigerant flowing in the refrigerant tubes 160a. The heat exchange unit exchanges heat between the refrigerant that flows in the refrigerant tubes 160a and air serving as a third fluid (outside air blown by a blower fan 11) that flows around the refrigerant tubes 160a.

Meanwhile, the radiator unit 430 is a heat exchange unit including a plurality of cooling medium tubes 430a in which a coolant serving as a second fluid flows, and a cooling medium-side tank portion 430c that extends in a stacking direction of the cooling medium tubes 430a and collects or distributes the coolant flowing in the cooling medium tubes 430a. The heat exchange unit exchanges heat between the coolant that flows in the cooling medium tubes 430a and air (outside air blown by the blower fan 11) that flows around the cooling medium tubes 430a.

First, a flat tube of which the cross-section perpendicular to the longitudinal direction has a flat shape is employed as the refrigerant tube 160a and the cooling medium tube 430a. Further, as shown in the exploded perspective view of FIG. 11, each of the refrigerant tubes 160a of the outdoor heat exchange unit 160 and the cooling medium tubes 430a of the radiator unit 430 are disposed in two rows in a flow direction X10 of outside air that is blown by the blower fan 11.

Furthermore, the refrigerant tubes 160a and the cooling medium tubes 430a, which are arranged on the windward side in the flow direction of outside air, are alternately stacked and disposed at a predetermined interval so that the flat surfaces of the outer surfaces of the refrigerant tubes and the cooling medium tubes are parallel to each other and face each other. Likewise, the refrigerant tubes 160a and the cooling medium tubes 430a, which are arranged on the leeward side in the flow direction of outside air, are also alternately stacked and disposed at a predetermined interval.

In other words, the refrigerant tube 160a of the heat exchanger is disposed between the cooling medium tubes 430a, and the cooling medium tube 430a is disposed between the refrigerant tubes 160a. In addition, spaces formed between the refrigerant tubes 160a and the cooling medium tubes 430a form outside air passages 70a (passages for the third fluid) through which outside air blown by the blower fan 11 flows.

Further, outer fins 50 are disposed on the outside air passages 70a. The outer fins 50 facilitate the heat exchange between the refrigerant of the outdoor heat exchange unit 160 and the outside air and the heat exchange between the coolant of the radiator unit 430 and the outside air, and allow heat to be transferred between the refrigerant flowing through the refrigerant tubes 160a and the coolant flowing through the cooling medium tubes 430a.

A corrugated fin, which is formed by bending a metal sheet having an excellent heat transfer property in a wavy shape, is employed as the outer fin 50. In this heat exchanger, the outer fins 50 allow heat to be transferred between the refrigerant tubes 160a and the cooling medium tubes 430a by being joined to both the refrigerant tubes 160a and the cooling medium tubes 430a.

Next, the refrigerant-side tank portion 160c and the cooling medium-side tank portion 430c will be described. The basic structure of the tank portion 160c is the same as that of the tank portion 430c. The refrigerant-side tank portion 160c includes a refrigerant-side fixing plate member 161 to which both the refrigerant tubes 160a and the cooling medium tubes 430a disposed in two rows are fixed, a refrigerant-side intermediate plate member 162 that is fixed to the refrigerant-side fixing plate member 161, and a refrigerant-side tank forming member 163.

A plurality of recesses 162b are formed on the refrigerant-side intermediate plate member 162. As shown in the cross-sectional view of FIG. 12, the plurality of recesses 162b form a plurality of spaces, which communicate with the cooling medium tubes 430a, between the refrigerant-side fixing plate member 161 and the refrigerant-side intermediate plate member 162 when the refrigerant-side intermediate plate member 162 is fixed to the refrigerant-side fixing plate member 161. The spaces function as communication spaces for a cooling medium that allow the cooling medium tubes 430a disposed in two rows in the flow direction X10 of outside air to communicate with each other.

Meanwhile, for the purpose of clarification, the cross-section of a portion near recesses 432b, which are formed on a cooling medium-side intermediate plate member 432, is shown in FIG. 12. However, since the basic structure of the refrigerant-side tank portion 160c is the same as that of the cooling medium-side tank portion 430c as described above, the refrigerant-side fixing plate member 161 and the recesses 162b are described while being put in parentheses.

Further, first communication holes 162a (FIG. 11), which pass through the refrigerant-side intermediate plate member 162 from the surface to the back, are formed at portions of the refrigerant-side intermediate plate member 162 that correspond to the refrigerant tubes 160a, and the refrigerant tubes 160a pass through the first communication holes 162a. Accordingly, the refrigerant tubes 160a communicate with a space that is formed in the refrigerant-side tank forming member 163.

Furthermore, the refrigerant tubes 160a further protrude toward the refrigerant-side tank portion 160c than the cooling medium tubes 430a at an end portion of the heat exchanger corresponding to the refrigerant-side tank portion 160c. That is, end portions of the refrigerant tubes 160a facing the refrigerant-side tank portion 160c and end portions of the cooling medium tubes 430a facing the refrigerant-side tank portion 160c are disposed so as not to be aligned with each other.

The refrigerant-side tank forming member 163 is fixed to the refrigerant-side fixing plate member 161 and the refrigerant-side intermediate plate member 162, so that a collection space 163a in which the refrigerant is collected and a distribution space 163b in which the refrigerant is distributed are formed in the refrigerant-side tank forming member 163. Specifically, the refrigerant-side tank forming member 163 is formed by performing pressing on a flat metal plate so as to have a two-ridge shape (W shape) when viewed in a longitudinal direction thereof.

Further, a middle portion 163c of the two-ridge shaped portion of the refrigerant-side tank forming member 163 is joined to the refrigerant-side intermediate plate member 162, so that the collection space 163a and the distribution space 163b are partitioned. Meanwhile, in this heat exchanger, the collection space 163a is disposed on the windward side in the flow direction X10 of outside air and the distribution space 163b is disposed on the leeward side in the flow direction X10 of outside air.

The middle portion 163c is formed in a shape corresponding to the recesses 162b, which are formed on the refrigerant-side intermediate plate member 162, and the collection space 163a and the distribution space 163b are partitioned so that the refrigerant present in the spaces do not leak from joints of the refrigerant-side fixing plate member 161 and the refrigerant-side intermediate plate member 162.

Furthermore, the refrigerant tubes 160a pass through the first communication holes 162a of the refrigerant-side intermediate plate member 162 and protrude toward the collection space 163a or the distribution space 163b formed in the refrigerant-side tank forming member 163 as described above, so that the refrigerant tubes 160a arranged on the windward side in the flow direction X10 of outside air communicate with the collection space 163a and the refrigerant tubes 160a arranged on the leeward side in the flow direction X10 of outside air communicate with the distribution space 163b.

Further, a refrigerant inflow tube 164 that allows a refrigerant to flow into the distribution space 163b and a refrigerant outflow tube 165 that allows a refrigerant to flow out of the collection space 163a are connected to one end of the refrigerant-side tank forming member 163 in a longitudinal direction. Furthermore, the other end of the refrigerant-side tank forming member 163 in the longitudinal direction is closed by a closing member.

Meanwhile, as shown in FIG. 11, the cooling medium-side tank portion 430c also includes a cooling medium-side fixing plate member 431 that has the same structure as the structure of the refrigerant-side tank portion, a cooling medium-side intermediate plate member 432 that is fixed to the cooling medium-side fixing plate member 431, and a cooling medium-side tank forming member 433.

In addition, communication spaces for a refrigerant, which allow the refrigerant tubes 160a disposed in two rows in the flow direction X10 of outside air to communicate with each other, are formed between the cooling medium-side fixing plate member 431 and the cooling medium-side intermediate plate member 432 by the recesses 432b that are formed on the cooling medium-side intermediate plate member 432.

Further, second communication holes 432a (FIG. 11), which pass through the cooling medium-side intermediate plate member 432 from the surface to the back, are formed at portions of the cooling medium-side intermediate plate member 432 that correspond to the cooling medium tubes 430a, and the cooling medium tubes 430a pass through the second communication holes 432a. Accordingly, the cooling medium tubes 430a communicate with a space that is formed in the cooling medium-side tank forming member 433.

Accordingly, the cooling medium tubes 430a further protrude toward the cooling medium-side tank portion 430c than the refrigerant tubes 160a at an end portion of the cooling medium-side tank portion 430c. That is, end portions of the refrigerant tubes 160a facing the cooling medium-side tank portion 430c and end portions of the cooling medium tubes 430a facing the cooling medium-side tank portion 430c are disposed so as not to be aligned with each other.

Furthermore, the cooling medium-side tank forming member 433 is fixed to the cooling medium-side fixing plate member 431 and the cooling medium-side intermediate plate member 432, so that a collection space 433a for a cooling medium and a distribution space 433b for a cooling medium partitioned by a middle portion 433c of the cooling medium-side tank forming member 433 are formed in the cooling medium-side tank forming member 433. Meanwhile, in this heat exchanger, the distribution space 433b is disposed on the windward side in the flow direction X10 of outside air and the collection space 433a is disposed on the leeward side in the flow direction X10 of outside air.

Further, a cooling medium inflow tube 434 that allows a cooling medium to flow into the distribution space 433b and a cooling medium outflow tube 435 that allows a cooling medium to flow out of the collection space 433a are connected to one end of the cooling medium-side tank forming member 433 in a longitudinal direction. Furthermore, the other end of the cooling medium-side tank portion 430c in the longitudinal direction is closed by a closing member.

Accordingly, in the heat exchanger 70 of this embodiment, as shown in the schematic perspective view of FIG. 13, the refrigerant, which flows into the distribution space 163b of the refrigerant-side tank portion 160c through the refrigerant inflow tube 164, flows into the respective refrigerant tubes 160a, which are arranged on the leeward side in the flow direction X10 of outside air, of the refrigerant tubes 160a that are arranged in two rows.

Further, the refrigerant having flowed out of the respective refrigerant tubes 160a, which are arranged on the leeward side, flows into the respective refrigerant tubes 160a, which are arranged on the windward side in the flow direction X10 of outside air, through the communication spaces for a refrigerant that is formed between the cooling medium-side fixing plate member 431 and the cooling medium-side intermediate plate member 432 of the cooling medium-side tank portion 430c.

Furthermore, the refrigerant having flowed out of the respective refrigerant tubes 160a, which are arranged on the windward side, is collected in the collection space 163a of the refrigerant-side tank portion 160c and flows out of the refrigerant outflow tube 165 as shown by solid line arrows of FIG. 13. That is, in the heat exchanger 70, the refrigerant flows while turning back through the refrigerant tubes 160a that are arranged on the leeward side, the communication spaces for a refrigerant of the cooling medium-side tank portion 430c, and the refrigerant tubes 160a that are arranged on the windward side.

Likewise, the coolant flows while turning back through the cooling medium tubes 430a that are arranged on the windward side, the communication spaces for a cooling medium of the refrigerant-side tank portion 160c, and the cooling medium tubes 430a that are arranged on the leeward side. Accordingly, the flow direction of the refrigerant that flows in the adjacent refrigerant tubes 160a is opposite to the flow direction of the coolant that flows in the cooling medium tubes 430a.

Further, all of the refrigerant tubes 160a of the outdoor heat exchange unit 160, the cooling medium tubes 430a of the radiator unit 430, the respective components of the refrigerant-side tank portion 160c, the respective components of the cooling medium-side tank portion 430c, and the outer fins 50, which have been described above, are made of the same metal material (an aluminum alloy in this embodiment).

Furthermore, the refrigerant-side fixing plate member 161 and the refrigerant-side tank forming member 163 are fixed to each other by plastically deforming with the refrigerant-side intermediate plate member 162 interposed therebetween, and the cooling medium-side fixing plate member 431 and the cooling medium-side tank forming member 433 are fixed to each other by plastically deforming with the cooling medium-side intermediate plate member 432 interposed therebetween.

In addition, the entire heat exchanger 70, which is fixed by caulking, is put and heated in a heating furnace so that a brazing material previously cladded on the surfaces of the respective components is melted, and is cooled until the brazing material is solidified. As a result, the respective components are integrally brazed. Accordingly, the outdoor heat exchange unit 160 and the radiator unit 430 are integrated with each other.

(Summary)

Figure 14:
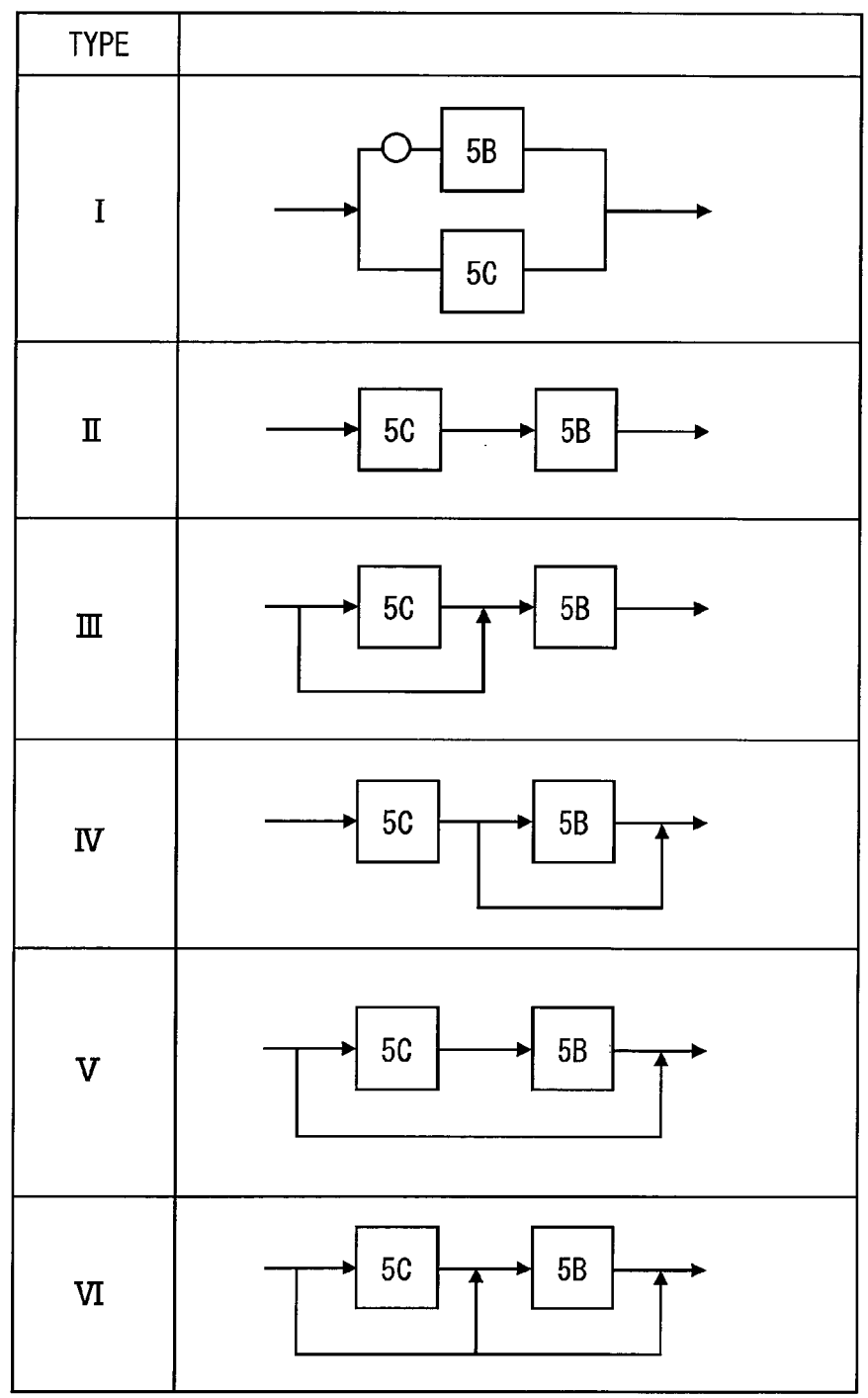
FIG. 14 is a diagram illustrating the summary of this disclosure as to a first heat exchanger and a plurality of heat exchangers that radiate the heat of a cooler circuit.

FIG. 14 is a diagram illustrating the summary of the embodiments of this disclosure according to a plurality of heat exchangers 5B, 5C that are connected to a cooler circuit 2R and radiate the heat of a coolant and the modifications thereof. Meanwhile, a first heat exchanger 5A is integrated with a second heat exchanger, but is not shown.

In type I of FIG. 14, a coolant can flow into the plurality of heat exchangers 5B, 5C at the same time, and a path along which a coolant passes through a flow control valve 8 forming a passage switching unit to flow in the second heat exchanger 5B and a path along which a coolant flows in the heat exchanger 5C from a heat-emitting device without passing through the flow control valve 8 are provided. Further, when the amount of heat radiated from the heat exchanger 5C increases up to a predetermined amount of heat, the amount of a coolant flowing in the heat exchanger 5B is increased. As a result, heat absorption and heating during the heating operation can be performed as in the case of FIG. 5.

In a type II of FIG. 14, the coolant of the second and third heat exchangers 5B, 5C, which serve as the internal fluid of these heat exchangers 5B, 5C, flows in series. Furthermore, the flow direction of air is opposite to the flow direction of the coolant, and air and the coolant face each other as counter flow. As a result, heat exchange efficiency between air and the coolant is improved. Further, in this type II, the third heat exchanger 5C is disposed on the upstream side in the flow direction of an internal fluid and the second heat exchanger 5B is disposed on the downstream side. Furthermore, when the first heat exchanger 5 is used in a heat pump and a heating operation is performed, the first heat exchanger 5 can form a heat exchanger for heat absorption and heating that absorbs the heat generated from the second heat exchanger 5B.

In FIG. 14, a type III is a type in which a bypass circuit bypassing the third heat exchanger 5C is provided in the type II. In this type, the amount of heat that is absorbed from the second heat exchanger 5B by the first heat exchanger 5A can be increased by allowing a refrigerant to flow in the bypass circuit.

In FIG. 14, a type IV is a type in which a bypass circuit bypassing the second heat exchanger 5B is provided in the type II. In this type, the influence of waste heat of the third heat exchanger 5C on the first heat exchanger 5A during a cooling operation can be reduced. As a result, the maximum amount of heat radiated from the third heat exchanger 5C can be increased. Further, if a heat-storage bypass passage, which bypasses at least the second heat exchanger 5B is provided in the cooler circuit as shown in FIG. 6 and a passage switching unit 34 for switching the flow of coolant into the heat-storage bypass passage or the second heat exchanger 5B is provided, a coolant, which has passed through the heat-storage bypass passage and stored heat, can be allowed to flow into the second heat exchanger 5B during the defrosting of a heat absorber.

In FIG. 14, a type V is a type in which a bypass circuit bypassing the heat exchangers 5C and 5B is provided in the type II. If the bypass circuit is used to store heat in this type V, the amount of heat stored by the heat-storage bypass passage can be increased as compared to the type IV and a coolant, which has passed through the heat-storage bypass passage and stored heat, can be allowed to flow into the second heat exchanger 5B via the third heat exchanger 5C during the defrosting of a heat absorber.

In FIG. 14, a type VI is a type in which a heat-storage bypass passage bypassing the third heat exchanger 5C and a heat-storage bypass passage bypassing the second heat exchanger 5B are provided. According to this, the functions of the types II to V can be arbitrarily exhibited by the switching in the combination of the plurality of heat-storage bypass passages.

What is claimed is:

1. A heat exchange system comprising:
    a first heat exchanger that radiates heat of at least a cooling cycle;
    a cooler circuit in which a coolant for a heat-emitting device flows;
    a plurality of heat exchangers that are connected to the cooler circuit and radiate heat of the coolant;
    a blower that sends air to the first heat exchanger and the plurality of heat exchangers to cool, wherein
        the plurality of heat exchangers are arranged in a blowing direction of the blower and separately radiate heat of the cooler circuit,
        one heat exchanger of the plurality of heat exchangers is disposed on a windward side and is thermally connected to the first heat exchanger, and the one heat exchanger disposed on the windward side radiates heat by itself and also radiates heat through the first heat exchanger,
        the plurality of heat exchangers comprises a second heat exchanger that is the one heat exchanger disposed on the windward side and a third heat exchanger that is disposed on a leeward side, the second heat exchanger being disposed adjacent to or integrally with the first heat exchanger, and
        the second heat exchanger and the third heat exchanger are arranged in a manner that the coolant which serves as internal fluid flows through the heat exchangers in parallel, and
    a flow control valve that controls a flow rate of the coolant in the second heat exchanger, the flow control valve is located between the second heat exchanger and a branch point of the cooler circuit where the coolant is branched and flows into the second heat exchanger and the third heat exchanger in parallel.

2. The heat exchange system according to claim 1, wherein
    the first heat exchanger comprises an air-conditioning heat exchanger that is a part of a first fluid circuit air-conditioning a passenger compartment of a vehicle, and
    the cooler circuit comprises a second fluid circuit that cools the heat-emitting device other than an engine of the vehicle.

3. The heat exchange system according to claim 1, wherein
    the first heat exchanger comprises a heat exchanger that radiates heat of brine flowing in a liquid-cool condenser after a refrigerant compressed by a compressor is cooled by the liquid-cool condenser.

4. The heat exchange system according to claim 1, wherein
    the first heat exchanger and the one heat exchanger disposed on the windward side, of the plurality of heat exchangers, comprise a three-fluid heat exchanger that transfers heat using a part of a core.

5. The heat exchange system according to claim 1, wherein
    the second heat exchanger and the third heat exchanger are arranged in a manner that the coolant which serves as internal fluid flows through the heat exchangers in series.

6. The heat exchange system according to claim 5, wherein
    the third heat exchanger is disposed on an upstream side and the second heat exchanger is disposed on a downstream side in a flow direction of the internal fluid.

7. The heat exchange system according to claim 5, wherein
    the second heat exchanger disposed on the windward side and the third heat exchanger disposed on the leeward side are arranged in a manner that the coolant which serves as internal fluid flows in series from the third heat exchanger to the second heat exchanger and that the coolant flows to be a counter flow against a flow of air.

8. The heat exchange system according to claim 1, wherein
    the refrigerating cycle comprises a heat pump cycle that is capable of cooling and heating air in a passenger compartment of a vehicle, and includes a cooling/heating switching unit that switches a heating cycle and the cooling cycle from each other, and
    the first heat exchanger of the cooling cycle operates as a heat absorber when being switched to the heating cycle.

9. The heat exchange system according to claim 1, wherein
    the refrigerating cycle comprises a heat pump cycle that is capable of cooling and heating air in a passenger compartment of a vehicle, and includes a cooling/heating switching unit that switches a heating cycle and the cooling cycle from each other,
    the first heat exchanger of the cooling cycle operates as a heat absorber when being switched to the heating cycle, and
    the flow control valve is controlled so that the coolant flows to the second heat exchanger when the heating cycle operates.

10. The heat exchange system according to claim 1, wherein
    the refrigerating cycle comprises a heat pump cycle that is capable of cooling and heating air in a passenger compartment of a vehicle, and includes a cooling/heating switching unit that switches a heating cycle and the cooling cycle from each other, the first heat exchanger of the cooling cycle operates as a heat absorber when being switched to the heating cycle, the cooler circuit is provided with a heat-storage bypass passage bypassing at least the second heat exchanger, and a passage switching unit switching the coolant to flow into the heat-storage bypass passage or the second heat exchanger, and the passage switching unit causes the coolant which has passed through the heat-storage bypass passage to flow into the second heat exchanger at a time of defrosting the heat absorber.

11. The heat exchange system according to claim 10, wherein the passage switching unit causes the heat-storage bypass passage to store heat by flowing the coolant at a time of not defrosting, and the passage switching unit stops the coolant from flowing into the heat-storage bypass passage and allows the coolant, which has stored heat, to flow into the second heat exchanger at the time of defrosting.

12. The heat exchange system according to claim 1, wherein the heat-emitting device of the cooler circuit comprises a device other than an engine, and the third heat exchanger is integrated with a heat exchanger for the engine.

13. The heat exchange system according to claim 12, wherein the third heat exchanger and the heat exchanger for the engine transfer heat to each other using a part of a core and are integrally formed as a three-fluid heat exchanger that exchanges heat with air.

14. The heat exchange system according to claim 12, wherein the first heat exchanger and the second heat exchanger transfer heat to each other using a part of a core and are integrally formed as a first three-fluid heat exchanger on a windward side, and the third heat exchanger and the heat exchanger for the engine transfer heat to each other using a part of a core and are integrally formed as a second three-fluid heat exchanger on a leeward side.

15. The heat exchange system according to claim 14, wherein the first three-fluid heat exchanger and the second three-fluid heat exchanger are further integrated with each other, so that the first heat exchanger, the second heat exchanger, the third heat exchanger, and the heat exchanger for the engine transfer heat to each other using a part of a common core.

16. The heat exchange system according to claim 1, wherein the heat exchange system further has a heat-storage bypass passage bypassing the second heat exchanger, and a passage switching unit switching the coolant to flow into the heat-storage bypass passage or the second heat exchanger, and the passage switching unit is position at a connection point connecting the heat-storage bypass passage to the cooler circuit.

17. The heat exchange system according to claim 1 further comprising:

a control device configured to control the opening of the flow control valve when it is determined that a temperature of the coolant is higher than or equal to a predetermined temperature such that heat is radiated not only in the third heat exchanger but also in the second heat exchanger.

* * * * *